(12) United States Patent
Xiao

(10) Patent No.: US 8,758,694 B2
(45) Date of Patent: Jun. 24, 2014

(54) HOLDING SEALING MATERIAL, METHOD FOR WINDING THE HOLDING SEALING MATERIAL AROUND OBJECT AND EXHAUST GAS PURIFYING APPARATUS

(75) Inventor: Peng Xiao, Farmington Hills, MI (US)

(73) Assignee: Ibiden Co., Ltd., Ogaki-shi (JP)

( * ) Notice: Subject to any disclaimer, the term of this patent is extended or adjusted under 35 U.S.C. 154(b) by 426 days.

(21) Appl. No.: 13/108,931

(22) Filed: May 16, 2011

(65) Prior Publication Data

US 2011/0280772 A1    Nov. 17, 2011

Related U.S. Application Data

(60) Provisional application No. 61/345,151, filed on May 17, 2010.

(51) Int. Cl.
*B01D 50/00* (2006.01)

(52) U.S. Cl.
USPC ........................................................ 422/179

(58) Field of Classification Search
CPC .............. B32B 3/00; B32B 3/02; B32B 3/06; B32B 5/22; B32B 5/24; F01N 3/2853; F01N 3/2864
USPC .................................................. 422/179, 180
See application file for complete search history.

(56) References Cited

U.S. PATENT DOCUMENTS

| | | | |
|---|---|---|---|
| 5,332,609 A * | 7/1994 | Corn | 428/77 |
| 6,613,295 B1 | 9/2003 | Kageyama et al. | |
| 2003/0175177 A1 * | 9/2003 | Tosa et al. | 422/179 |
| 2009/0022633 A1 | 1/2009 | Tomosue et al. | |
| 2010/0071356 A1 * | 3/2010 | Tabata | 60/311 |

FOREIGN PATENT DOCUMENTS

| | | | |
|---|---|---|---|
| EP | 0299626 A2 * | 1/1999 | F01N 3/28 |
| EP | 2067950 | 6/2009 | |
| EP | 2112342 | 10/2009 | |
| EP | 2123880 | 11/2009 | |
| JP | 2007-218221 | 8/2007 | |
| JP | 2009-264186 | 11/2009 | |

* cited by examiner

*Primary Examiner* — Tom Duong
(74) *Attorney, Agent, or Firm* — Ditthavong Mori & Steiner, P.C.

(57) ABSTRACT

A holding sealing material includes laminated mats. One or more fixed parts partially combine the mats. Each of the mats has a basic rectangular shape. Each of the mats has a recess on one of shorter sides of the rectangular shape and a projection on another shorter side and is designed to be wound around an object to be wound so that the projection and the recess are fitted to each other. The mats have respective longitudinal lengths that increase as a distance from the object to each of the mats increases. A mat that is placed at a closest position to the object has a shortest longitudinal length. An area of the projection of the mat that is placed at a closest position to the object is smaller than an area of the projection of a mat that is placed at a farthest position from the object.

28 Claims, 17 Drawing Sheets

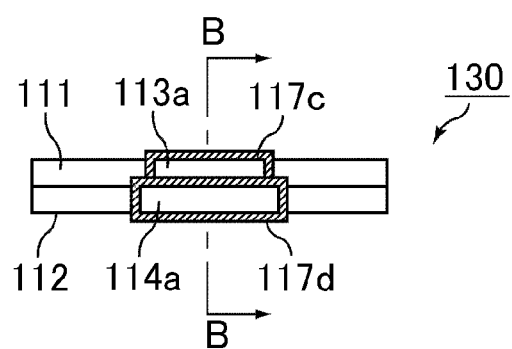
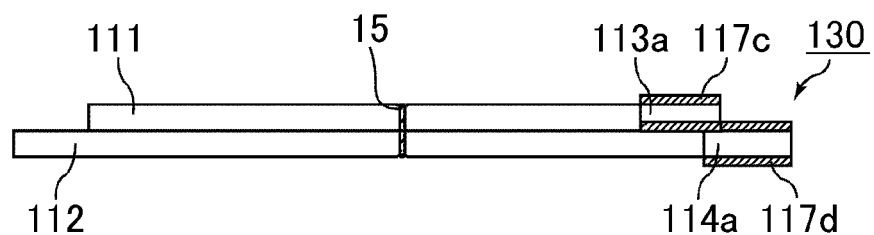

HOLDING SEALING MATERIAL, METHOD FOR WINDING THE HOLDING SEALING MATERIAL AROUND OBJECT AND EXHAUST GAS PURIFYING APPARATUS

CROSS-REFERENCE TO RELATED APPLICATIONS

The present application claims the benefit of priority to U.S. Application No. 61/345,151, filed May 17, 2010. The contents of that application are incorporated herein by reference in their entirety.

BACKGROUND OF THE INVENTION

1. Field of the Invention

The present invention relates to a holding sealing material, a method for winding the holding sealing material around an object to be wound, and an exhaust gas purifying apparatus.

2. Discussion of the Background

Exhaust gas discharged from internal combustion engines such as diesel engines contains particulate matter (hereinafter, also referred to as PM). In recent years, there has arisen a serious problem that PM is harmful to the environment and human bodies. Moreover, since exhaust gas also contains toxic gas components such as CO, HC and NOx, there have been growing concerns about influences of these toxic gas components on the environment and human bodies.

In view of these, there have been proposed various exhaust gas purifying apparatuses intended for collecting PM in exhaust gas and for converting the toxic gas components. These exhaust gas purifying apparatuses include: an exhaust gas treating body made of porous ceramics such as silicon carbide and cordierite; a casing for accommodating the exhaust gas treating body; and a holding sealing material that is made of an inorganic fiber aggregate and is disposed between the exhaust gas treating body and the casing. This holding sealing material is used mainly for purposes such as protection of the exhaust gas treating body from damage that may be caused by contact between the exhaust gas treating body and the casing surrounding the exhaust gas treating body as a result of vibrations and impacts during travel of an automobile or the like; and prevention of exhaust gas leakage from space between the exhaust gas treating body and the casing.

This holding sealing material is formed by a mat containing inorganic fibers. The mat has a basic rectangular shape having longer sides along the longitudinal direction and shorter sides substantially perpendicular to the longer sides in a plan view. One of the shorter sides of the rectangular shape has a recess and the other shorter side has a projection having the same shape as the cut-out part of the recess. The mat is wound around the exhaust gas treating body and the projection is fitted into the recess. In this state, the holding sealing material serves to prevent exhaust gas from leaking out.

In recent years, there has been a growing demand for good warming performance of the holding sealing material in order to allow the exhaust gas treating body to effectively exhibit its exhaust gas treating performance by keeping the exhaust gas treating body sufficiently warm. This demand can be satisfied with a structure in which there is a larger space between the exhaust gas treating body and the casing, and the holding sealing material is disposed in the space to prevent heat transfer between the exhaust gas treating body and the casing. To achieve this structure, the holding sealing material should be thicker.

Moreover, in order to make the holding sealing material more firmly hold the exhaust gas treating body, there is also a growing demand for further enhancement of repulsion of inorganic fibers, which is a factor contributing to holding ability. To meet this demand, the weight per unit area (basis weight) of the holding sealing material should be increased.

The thickness or weight per unit area (basis weight) of the holding sealing material can be increased by increasing the thickness of the mat of the holding sealing material. However, in recent years, multi-layer mats obtained by laminating a plurality of mats have been used to increase the thickness or the basis weight of the holding sealing material, instead of changing the mat thickness.

In the case that such a holding sealing material including a plurality of mats is wound around the exhaust gas treating body, the projection and the recess of each mat should be successfully fitted to each other under proper control of the tension in the mats.

JP-A 2007-218221 and JP-A 2009-264186 listed below disclose holding sealing materials of a multi-layer structure designed with consideration for fitting between the projections and the recesses.

JP-A 2007-218221 recites a holding sealing material (monolith holding material) designed such that laminated mats can be wound around a monolith without looseness of the mats with fitting parts on both sides of each mat fitted to each other (Claim 1). JP-A 2007-218221 also teaches that in order to secure the above performance of the holding sealing material, the laminated mats are fixed to one another with at least one end being freely movable (Claim 3).

JP-A 2009-264186 discloses a holding sealing material in which a plurality of mats have a longitudinal length that sequentially increases with the order of lamination, the mats are fixed with one another at two or more fixed parts, and at least two of the fixed parts are located at different positions in the longitudinal direction in a side view.

The contents of JP-A 2007-218221 and JP-A 2009-264186 are incorporated herein by reference in their entirety.

SUMMARY OF THE INVENTION

According to one aspect of the present invention, a first holding sealing material includes a plurality of laminated mats and one or more fixed parts. The mats each include inorganic fibers. The fixed parts partially combine the mats. Each of the mats has a basic rectangular shape that has longer sides along a longitudinal direction of the mats and shorter sides substantially perpendicular to the longer sides in a plan view. Each of the mats has a recess on one of the shorter sides of the rectangular shape, and a projection on another shorter side. Each of the mats is designed to be wound around an object to be wound so that the projection and the recess are fitted to each other. The mats have respective longitudinal lengths that increase as a distance from the object to each of the mats increases. A mat that is placed at a closest position to the object has a shortest longitudinal length. An area of the projection of the mat that is placed at the closest position to the object is smaller than an area of the projection of a mat that is placed at a farthest position from the object.

According to another aspect of the present invention, a method for winding a holding sealing material around an object to be wound includes winding the first holding sealing material around the object. The winding includes bringing a side with recesses of the first holding sealing material into contact with the object. Projections of the first holding sealing material are fitted into the recesses.

According to further aspect of the present invention, a second holding sealing material includes a plurality of laminated mats and one or more fixed parts. The mats each include inorganic fibers. The fixed parts partially combine the mats. Each of the mats has a basic rectangular shape that has longer sides along a longitudinal direction of the mats and shorter sides substantially perpendicular to the longer sides in a plan view. Each of the mats has a recess on one of the shorter sides of the rectangular shape, and a projection on another shorter side. Each of the mats is designed to be wound around an object to be wound so that the projection and the recess are fitted to each other. The mats have respective longitudinal lengths that increase as a distance from the object to each of the mats increases. A mat that is placed at a closest position to the object has a shortest longitudinal length. An area of the projection of a mat that is placed at a farthest position from the object is smaller than an area of the projection of the mat that is placed at the closest position to the object.

According to further aspect of the present invention, a method for winding a holding sealing material around an object to be wound includes winding the second holding sealing material around the object. The winding includes bringing a side with projections of the second holding sealing material in contact with the object. Recesses of the second holding sealing material are fitted to the projections.

According to further aspect of the present invention, an exhaust gas purifying apparatus includes a pillar-shaped exhaust gas treating body, a casing, and a holding sealing material. The exhaust gas treating body has cell walls extending along a longitudinal direction of the exhaust gas treating body to define a plurality of cells. The casing accommodates the exhaust gas treating body. The holding sealing material is disposed between the exhaust gas treating body and the casing to hold the exhaust gas treating body. The holding sealing material includes the first holding sealing material.

According to further aspect of the present invention, an exhaust gas purifying apparatus includes a pillar-shaped exhaust gas treating body, a casing, and a holding sealing material. The exhaust gas treating body has cell walls extending along a longitudinal direction of the exhaust gas treating body to define a plurality of cells. The casing accommodates the exhaust gas treating body. The holding sealing material is disposed between the exhaust gas treating body and the casing to hold the exhaust gas treating body. The holding sealing material includes the second holding sealing material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 18A is a front view of a holding sealing material of an eighth embodiment of the present invention; and FIG. 18B is a B-B line cross-sectional view of the holding sealing material illustrated in FIG. 18A along the longitudinal direction;

DESCRIPTION OF THE EMBODIMENTS

Figure 1:
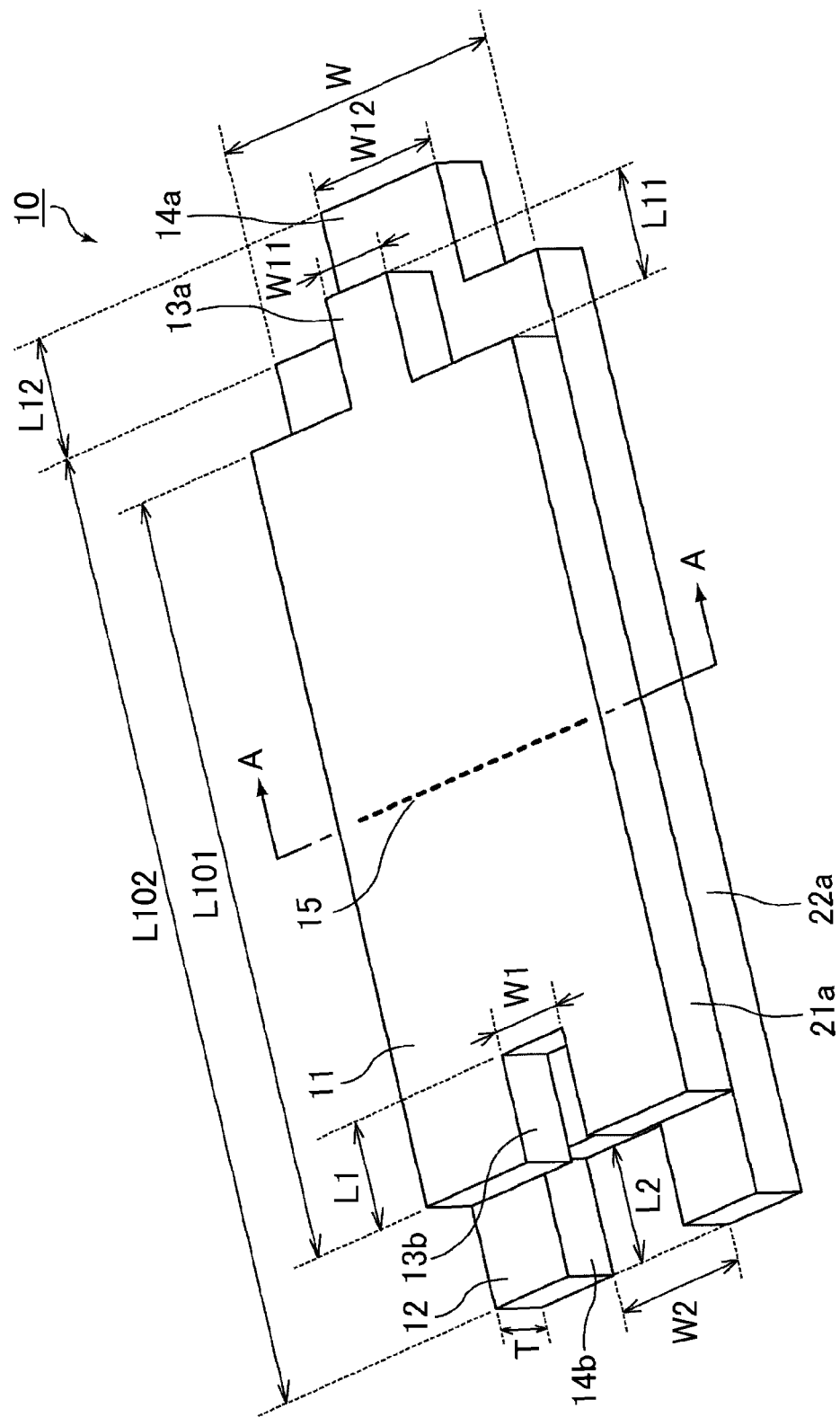
FIG. 1 is a perspective view schematically illustrating a holding sealing material of a first embodiment of the present invention.

The embodiments will now be described with reference to the accompanying drawings, wherein like reference numerals designate corresponding or identical elements throughout the various drawings.

The holding sealing material of JP-A 2007-218221 has a continuous linear bonding part formed by machine-sewing along the width direction of the mats in order to prevent free movement of the mats in the width direction, which is a problem accompanied by the use of a plurality of laminated mats.

In recent years, in terms of energy saving, automatic equipment has been introduced to perform a part of a winding process for winding a holding sealing material around an exhaust gas treating body. In the case that mats are dislocated in the width direction, such automatic equipment, however, may finish the winding process with the mats partially overlapping each other without their fitting parts being completely fitted to each other. In the case that the holding sealing material in this state is installed in a metal case, an excess load is applied to inorganic fibers in the overlaps of the mats due to excess fiber filling density in the overlaps. As a result, the fibers may be damaged, and in turn, several other problems may occur. Specifically, the holding ability of the mats may be reduced, or the mats may be damaged due to wind erosion by exhaust gas, and thereby may cause exhaust gas leakage.

In contrast, in the holding sealing material of JP-A 2009-264186, the mats are fixed at two or more fixed parts, and two out of the fixed parts are located at different positions in the longitudinal direction.

A holding sealing material according to an embodiment of the present invention includes:

a plurality of laminated mats each including inorganic fibers, and one or more fixed parts partially combining the mats, wherein the mats each have a basic rectangular shape that has longer sides along a longitudinal direction of the mats and shorter sides substantially perpendicular to the longer sides in a plan view, the mats each have a recess on one of the shorter sides of the rectangular shape, and a projection on an other shorter side, the mats each are designed to be wound around an object to be wound with the projection and the recess fitted to each other, the mats have a longitudinal length that sequentially increases with a distance away from the object such that a mat to be closest to the object has the shortest longitudinal length, and an area of the projection of the mat to be closest to the object is smaller than an area of the projection of a mat to be farthest from the object.

In the holding sealing material according to the embodiment of the present invention, the projection of the mat to be closest to the object has a smaller area than the projection of the mat to be farthest from the object. This structure is likely to enable the projection of the mat farthest from the object to press the projection of the mat closest to the object into the recess with stronger force when the holding sealing material is wound around the object, compared to conventional ones including a plurality of mats each having a projection of the same area. Therefore, this structure is likely to enable the projection of the mat closest to the object to be successfully fitted into the recess even if this mat, which is located inward of other mat(s), is difficult to see. Consequently, it becomes easier to reduce the probability of overlap between a part of the projection and the area surrounding the recess or another mat. Even if a plurality of mats are dislocated in the width direction of the mats, the projection of the mat farthest from the object is more likely to overlap the projection of the mat closest to the object, compared to that in conventional cases in which a plurality of mats each have a projection of the same area. This is because the projection of the mat farthest from the object has a larger area than the projection of the mat closest to the object. In this way, it becomes easier to reduce the probability of overlap between a part of the projection of the mat to be closest to the object and the area surrounding the recess or another mat.

As described above, the above structure is likely to prevent overlap between mats, and thereby likely to prevent excess load on inorganic fibers. Consequently, it becomes easier to prevent deterioration of the holding ability of the mats, which is caused by damage to fibers. In the case that the holding sealing material is used for an exhaust gas treating body such as a catalyst carrier or an exhaust gas filter, this structure tends to prevent development of wind erosion caused by exhaust gas and to completely eliminate the possibility of exhaust gas leakage.

In the case that the one or more fixed parts for combining the mats extend along the width direction perpendicular to the longitudinal direction of the mats, the fixed parts extend along the direction perpendicular to the direction in which the holding sealing material is wound around the object. In this case, the holding sealing material tends to avoid difficulty caused by tensile stress generated, in particular, on the outer surface when the holding sealing material is wound around the object. Accordingly, this structure is likely to ensure the winding ability of the holding sealing material. In addition, this structure tends to prevent the mats from curling up from the longer sides of the mats, and thereby tends to more positively prevent dislocation between mats.

The holding sealing material according to the embodiment of the present invention tends to exhibit the above-mentioned effects in the case that the holding sealing material is wound around the object by a method including bringing the side with the recesses of the holding sealing material into contact with the object and then fitting the projections into the recesses.

Preferably, in the holding sealing material according to an embodiment of the present invention, the projections of the mats have an area that sequentially decreases in the order from the mat to be farthest from the object to the mat to be closest to the object. In this case, the projection of a mat to be closer to the object is pressed into the corresponding recess with strong force by the projection of a mat to be farther from the object when the mats are wound around the object. Therefore, this structure is likely to enable the projections to be successfully fitted into the recesses even if mats are slightly dislocated in the width direction due to deformation of a mat or the like. In addition, this structure is likely to enable the projection of a mat closer to the object to be successfully fitted into the corresponding recess even if this mat, which is located inward of other mat(s), is difficult to see. Consequently, it becomes easier to prevent overlap between mats. In the case that the holding sealing material is used for an exhaust gas treating body such as a catalyst carrier or an exhaust gas filter, this structure tends to prevent development of wind erosion caused by exhaust gas and to completely eliminate the possibility of exhaust gas leakage.

In the holding sealing material according to an embodiment of the present invention, the projection of the mat to be closest to the object and the projection of the mat to be farthest from the object preferably have a same projecting length in the longitudinal direction of the mats, and the projection of the mat to be closest to the object preferably has a narrower width than the projection of the mat to be farthest from the object.

In the holding sealing material according to an embodiment of the present invention, the projection of the mat to be closest to the object preferably has a shorter projecting length in the longitudinal direction of the mats than the projection of the mat to be farthest from the object, and the projection of the mat to be closest to the object preferably has a narrower width than the projection of the mat to be farthest from the object.

In the holding sealing material according to an embodiment of the present invention, in a state that the holding sealing material is wound around the object, one of sides of the projection projecting along the longitudinal direction of the mat farthest from the object preferably overlies one of sides of the projection projecting along the longitudinal direction of the mat closest to the object, and the projection of the mat to be closest to the object preferably has a narrower width than the projection of the mat to be farthest from the object.

In the holding sealing material according to an embodiment of the present invention, at least one of the mats preferably has one or more additional projections.

The holding sealing materials according to the embodiments of the present invention are likely to enable the projections to be successfully fitted into the recesses even if mats are slightly dislocated in the width direction due to deformation of a mat or the like when these holding sealing materials are wound around the object. These holding sealing materials also are likely to enable the projection of a mat closer to the object to be successfully fitted into the corresponding recess even if this mat, which is located inward of other mat(s), is difficult to see. Consequently, it becomes easier to prevent overlap between mats.

In the holding sealing material according to an embodiment of the present invention, the number of the fixed parts is preferably at least two, and in a projection view of the fixed parts to the side face along the longitudinal direction of the mats, at least two fixed parts out of the fixed parts are preferably disposed at different positions in the longitudinal direction. This structure tends to more positively prevent dislocation between mats compared to a holding sealing material with only one fixed part. Specifically, in the case that the holding sealing material has only one fixed part, mats may be dislocated in the width direction around the fixed part. This may be mainly because both end portions of the holding sealing material are free ends and are less likely to be in the control against dislocation in the width direction. In contrast, if at least one additional fixed part is provided at a different position in the longitudinal direction from the position of the above fixed part in a projection view, like the holding sealing material according to the embodiment of the present invention, the mats are largely restricted in freedom of dislocation in the width direction because at least either one side of each fixed part is fixed. Thus, the holding sealing material according to the embodiment of the present invention tends to more positively prevent dislocation between mats in the width direction. Owing to its tendency to prevent dislocation between mats, the holding sealing material is easy to handle when it is wound around the object, and therefore the working efficiency is likely to be improved.

Here, the phrase "in a projection view" herein means that the fixed parts are projected onto the longitudinal axis in the side view.

In the holding sealing material according to an embodiment of the present invention, the fixed parts are preferably spaced apart from at least one of the longer sides of each mat. Since the fixed parts do not extend over the mats along the width direction, the mats do not require a fixing treatment on the longer sides. If a fixed part is formed to extend to the longer sides, the ends of the formed fixed part may be problematically damaged because the longer sides of the holding sealing material is abraded during use or because stress may be applied to portions near the longer sides. However, in the case that the fixed parts are spaced apart from the longer sides, like the holding sealing material according to the embodiment of the present invention, it becomes easier to prevent stress concentration caused in the case that the fixing treatment is performed on the longer sides. Consequently, it is possible to prevent damage to the mats.

Preferably, the holding sealing material according to an embodiment of the present invention further includes a flammable film covering a fitting portion of the projections of the mats. In this case, the projections and the recesses tend to be more smoothly fitted to each other. This is specifically because each projection is more likely to smoothly slide the faces defining each recess (fitting portions) when the projections are pressed into the recesses, compared to those with a surface on which fibers are exposed.

Here, the term "fitting portions" herein means the peripheral faces of the projection and the faces defining the recess along the thickness direction. The term "fitting portions of the projection" means faces along the thickness direction of the projection which are in contact with the faces defining the recess in the state that the projection and the recess are fitted to each other. There may be a minute gap between the fitting portions in the state that the projection and the recess are fitted to each other.

The flammable film may cover all of the fitting portions of the projections.

Preferably, the flammable film entirely covers the laminated mats of the holding sealing material according to an embodiment of the present invention. This holding sealing material tends to maintain the shape of the mats without binders or the like. Therefore, this holding sealing material is likely to be wound around the object with enhanced working efficiency. In addition, it becomes easier to prevent scatter of fibers contained in the mats.

The flammable film may be an air-permeable film or may be an air-impermeable film.

In the case that the laminated mats of the holding sealing material are covered with an air-permeable film, the holding sealing material is held therein at normal pressure. Since the flammable film has tenability, the holding sealing material tends to be easily wound around the object.

In the case that the laminated mats of the holding sealing material are covered with an air-impermeable film, the mats tend to be easily sealed up, for example, by thermally fusing the flammable film to form a sack-shaped film. It becomes easier to compress the mats by reducing pressure by forcibly discharging air in the inside of the sealed film using a vacuum pump or the like. In the case that the object to be wound is an exhaust gas treating body, the holding sealing material having this structure tends to be more easily inserted into a casing because the mats are compressed. Therefore, the working efficiency is likely to be enhanced. After the mats are wound around the exhaust gas treating body, the compressed mats recover their thickness by decomposition of the film by way of heat of exhaust gas or the like. As a result, the holding sealing material tends to be held without space between the exhaust gas treating body and the casing. Therefore, the exhaust gas treating body tends to be firmly held.

Preferably, in the holding sealing material according to an embodiment of the present invention, the flammable film covers each of the laminated mats. This holding sealing material tends to maintain the shape of the mats without binders or the like. Therefore, this holding sealing material tends to be wound around the object with enhanced working efficiency. Because all the mats more smoothly slide, this holding sealing material tends to be more successively wound around the object.

Preferably, in the holding sealing material according to an embodiment of the present invention, the mats each contain a binder. In this case, the mats tend to maintain their shape and have a reduced volume. Therefore, the holding sealing material tends to be wound around the object with improved working efficiency. For example, in the case of using an organic binder as the binder, it becomes easier to keep the mats compressed by impregnating the mats with the organic binder, compressing the mats with heat and pressure, and cooling the mats. After the mats are wound around the object, the organic binder is decomposed by way of heat of exhaust gas or the like. As a result, the mats are released from their compressed state. Thus, the holding sealing material tends to firmly hold the object in a manner similar to that described above.

Preferably, in the holding sealing material according to an embodiment of the present invention, the mats are needle-punched. In this case, the mats are less likely to break down and tend to maintain their shape to a certain degree. Therefore, the working efficiency of the holding sealing material is likely to be improved. The needle-punching may be performed, for example, on a sheet product formed by compressing an inorganic fiber precursor, or on a base mat including inorganic fibers.

If the mats are needle-punched along the width direction perpendicular to the longitudinal direction of the mats, creases are formed in a needle-punched area along the width direction of the mats. These creases make it easier to wind the holding sealing material around the object. The number of the needle-punching treatments and the number of the needles can be altered in accordance with the desired bulk density, weight per unit area, and the like.

In the holding sealing material according to an embodiment of the present invention, the inorganic fibers preferably include a complex of alumina and silica. This holding sealing material is likely to be excellent in properties such as heat resistance and elasticity, and thereby tends to exhibit excellent performances such as ability to hold the object.

The method for winding a holding sealing material around an object to be wound according to an embodiment of the present invention makes it easier to successively wind any one of the holding sealing materials according to the embodiments of the present invention around the object, by bringing the side with the recesses of the holding sealing material into contact with the object, and fitting the projections into the recesses. Here, the holding sealing material may be wound around the object by fitting the projection of each of the laminated mats into the corresponding recess one by one, or all the mat may be simultaneously wound around the object by bringing the side with the recesses in contact with the object and fitting all the projections of the mats into the recesses.

The holding sealing material according to an embodiment of the present invention includes a plurality of laminated mats each including inorganic fibers, and
one or more fixed parts partially combining the mats, wherein
the mats each have a basic rectangular shape that has longer sides along a longitudinal direction of the mats and shorter sides substantially perpendicular to the longer sides in a plane view,
the mats each have a recess on one of the shorter sides of the rectangular shape, and a projection on an other shorter side,
the mats each are designed to be wound around an object to be wound with the projection and the recess fitted to each other,
the mats have a longitudinal length that sequentially increases with a distance away from the object such that a mat to be closest to the object has the shortest longitudinal length, and
an area of the projection of a mat to be farthest from the object is smaller than an area of the projection of the mat to be closest to the object.

In the holding sealing material having the projections of this structure, portions on both sides of the recess of the mat to be farthest from the object have a larger area than portions on both sides of the recess of the mat to be closest to the object. Therefore, the portions on both sides of the recess of the mat to be closest to the object are pressed to the projection with stronger force by the portions on both sides of the recess of the mat to be farthest from the object, compared to those in conventional cases where portions on both side of recesses of a plurality of mats all have the same area. Therefore, this structure is likely to enable the recess of the mat closest to the object to be successfully fitted to the projection even if this mat, which is located inward of other mat(s), is difficult to see. Consequently, it becomes easier to reduce the probability of overlap between a part of the area surrounding the recess and the projection or another mat. Even if mats are dislocated in the width direction of the mats, the portions on both sides of the recess of the mat to be farthest from the object are more likely to overlap the portions on both sides of the recess of the mat to be closest to the object, compared to those in conventional cases where portions on both side of recesses of a plurality of mats all have the same area. This is because the portions on both side of the recess of the mat to be farthest from the object have a larger area than the portions on both sides of the recess of the mat to be closest to the object. In this way, it becomes easier to reduce the probability of overlap between mats.

This holding sealing material tends to exhibit the above effects in the case that the holding sealing material is wound around the object by a method including bringing the side with the projections of the holding sealing material into contact with the object and then fitting the recesses to the projections.

Preferably, in the holding sealing material according to an embodiment of the present invention, the projections of the mats have an area that sequentially decreases in the order from the mat to be closest to the object to the mat to be farthest from the object. Even if mats are slightly dislocated in the width direction due to deformation of a mat or the like when the mats are wound around the object, this structure is likely to enable the recess of a mat closer to the object to be successfully fitted to the corresponding projection even if this mat, which is located inward of other mat(s), is difficult to see. Consequently, it becomes easier to prevent overlap between the mats. In the case that the holding sealing material is used for an exhaust gas treating body such as a catalyst carrier or an exhaust gas filter, this structure tends to prevent development of wind erosion caused by exhaust gas and to completely eliminate the possibility of exhaust gas leakage.

The method for winding a holding sealing material around an object to be wound according to an embodiment of the present invention makes it easier to successively wind one of the holding sealing materials according to the embodiments of the present invention around the object, by bringing the side with the projections of the holding sealing material in contact with the object, and fitting the recesses to the projections. Here, the holding sealing material may be wound around the object by fitting the recess of each of the laminated mats to the corresponding projection one by one, or the mats may be simultaneously wound by bringing the side with the projections into contact with the object and fitting all the recesses of the mats simultaneously to the projections.

Regarding the holding sealing material according to an embodiment of the present invention, the object is preferably a catalyst carrier or an exhaust gas filter. In this case, the holding sealing material tends to provide various excellent properties to an exhaust gas treating device.

An exhaust gas purifying apparatus according to an embodiment of the present invention includes:

a pillar-shaped exhaust gas treating body having a plurality of cells longitudinally disposed in parallel with one another with a cell wall being interposed therebetween;

a casing accommodating the exhaust gas treating body; and a holding sealing material disposed between the exhaust gas treating body and the casing to hold the exhaust gas treating body, wherein the holding sealing material is anyone of the holding sealing materials according to the embodiments of the present invention.

Since the exhaust gas purifying apparatus is configured to include one of the holding sealing materials according to the embodiments of the present invention as the holding sealing material, overlap between mats is likely to be avoided even if the mats are slightly dislocated in the width direction due to deformation of a mat or the like when the holding sealing material is wound around the object, compared to a case that a conventional one including mats with projections of the same area is used. Accordingly, it becomes easier to prevent development of wind erosion caused by exhaust gas and to certainly prevent exhaust gas leakage. As a result, it becomes easier to prevent problems such as reduction of durability of the exhaust gas treating apparatus as a whole.

In the exhaust gas purifying apparatus according to an embodiment of the present invention, the exhaust gas treating body is preferably a catalyst carrier or an exhaust gas filter. In this case, the exhaust gas purifying apparatus tends to serve as an exhaust gas treating apparatus having various excellent properties.

The phrase "the projections and the recesses are fitted to each other" used herein means that the holding sealing material is wound around the object and the recesses are fitted to the projections or the projections are fitted into the recesses such that the holding sealing material can be kept wound around the object with at least faces of the projections along the longitudinal direction among the faces of the projections along the thickness direction being in contact with faces defining the recesses. Namely, the phrase means not only that the projections and the recesses are fitted to each other with all the faces of the projections along the thickness direction being in contact with the faces defining the recesses (the projections and the recesses are completely fitted to each other), but also that the projections and the recesses are fitted to each other with a minute gap between the faces of the projections along the thickness direction and the faces defining the recesses. The "minute gap" specifically means a gap with a width of from about 1 mm to about 10 mm. For example, in the case that the object is an exhaust gas treating body, such a gap may be included in the design by considering the size difference between the object and the holding sealing material in use, or may be formed by dropping of portion of inorganic fibers in a mat when the mat is cut into a desired shape, or formed because of other reasons.

Since the holding sealing material according to an embodiment of the present invention includes a plurality of laminated mats, even if such a gap is formed in a mat, the gap is covered with another mat. As a result, the holding sealing material tends to avoid the problem of gas leakage in use. As described above, in the case of using the holding sealing material for an exhaust gas treating body, such a gap substantially disappears because the holding sealing material is thermally expanded in use or is compressed and extended in the circumferential direction when stuffed into a casing in the state of being wound around the exhaust gas filter. Accordingly, the holding sealing material tends to sufficiently prevent gas leakage.

First Embodiment

The following description will discuss a first embodiment, which is one embodiment of the holding sealing material, the method for winding the holding sealing material around an object to be wound and the exhaust gas purifying apparatus of the present invention, with reference to drawings.

In the present embodiment, a holding sealing material having two laminated mats is described as an example. These mats are different in length of longer sides (hereinafter, also simply referred to as full length) but are the same in length of shorter sides (hereinafter, also referred to as width) and thickness.

Figure 2:
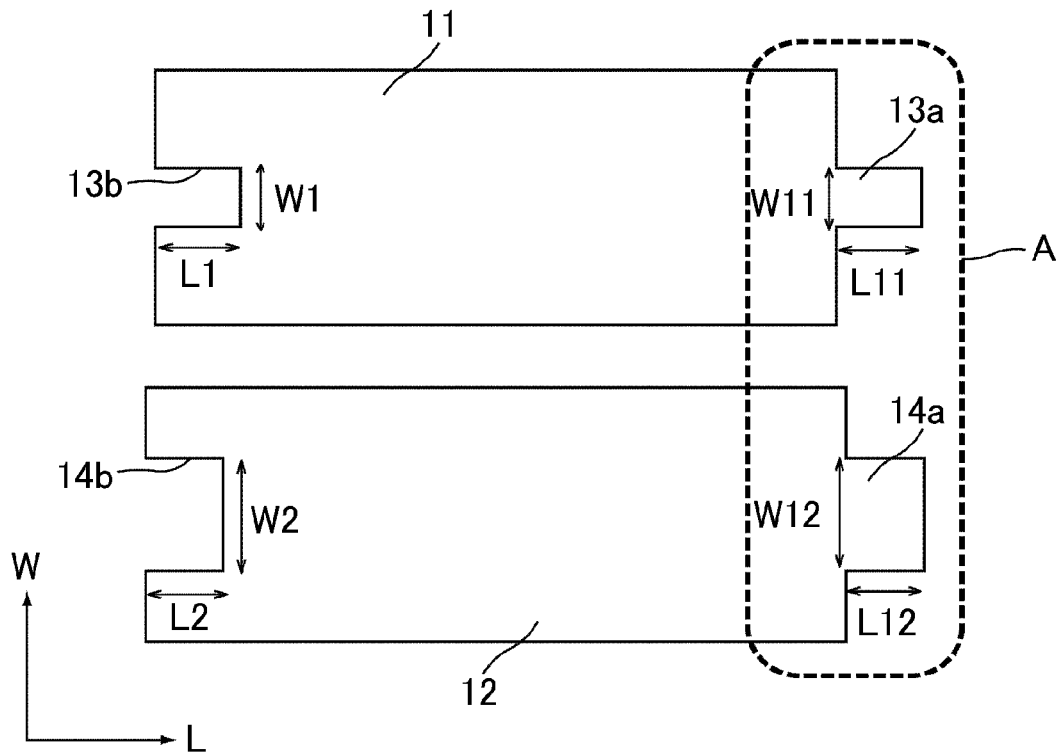
FIG. 2 is a plan view illustrating mats of the holding sealing material illustrated in FIG. 1.
Figure 3:
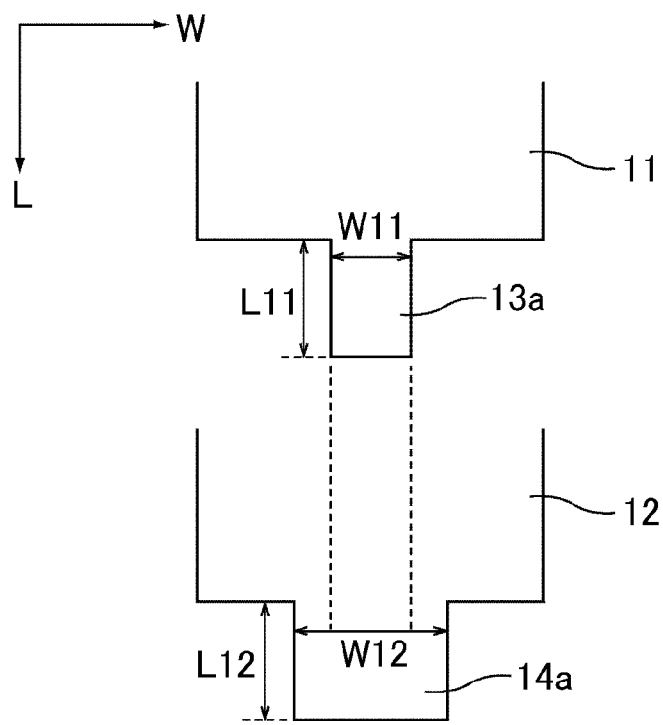
FIG. 3 is a plan view illustrating the area surrounded by the dotted line A in FIG. 2.

FIG. 1 is a perspective view illustrating the holding sealing material of the first embodiment of the present invention. FIG. 2 is a plan view illustrating mats of the holding sealing material illustrated in FIG. 1. FIG. 3 is a plan view illustrating the area surrounded by the dotted line A in FIG. 2.

As illustrated in FIG. 1, the holding sealing material 10 of the present embodiment has two laminated mats 11 and 12. The mats 11 and 12, when viewed in a plan view, have a substantially rectangular shape with longer sides along the longitudinal direction and shorter sides substantially perpendicular to the longer sides. In FIG. 1, the full lengths of the mats 11 and 12 are indicated by arrows L101 and L102, respectively, and the width and the thickness thereof are indicated by arrows W and T, respectively.

The mats 11 and 12 have projections 13a and 14a on either shorter side (hereinafter, also referred to as end portion), and have recesses 13b and 14b on the other shorter side. The projection 13a and the recess 13b of the mat 11, and the projection 14a and the recess 14b of the mat 12 have shapes which allow the projections 13a and 14a to be completely fitted to the recesses 13b and 14b, respectively, in the state that the holding sealing material 10 is wound around an object.

The phrase "the projection 13a and the recess 13b are completely fitted to each other" means that the projection 13a and the recess 13b are fitted to each other with all the peripheral faces of the projection 13a and all the faces defining the recess 13b being in contact with each other without gap. The projection 14a and the recess 14b are also fitted to each other in a similar manner.

Although the holding sealing material 10 illustrated in FIG. 1 has the two laminated mats 11 and 12 each having a thickness T of from about 1.5 mm to about 15 mm, the number of laminated mats is not particularly limited and may be three or more.

Among these mats, the mat whose full length is shortest (hereinafter, also referred to as shortest mat) is to be directly wound around the object, and a mat whose full length is longer than that of the shortest mat is laminated on the shortest mat. On these mats, mats with a longer full length are sequentially laminated. The last mat that is to be located farthest from the object has the longest full length among these mats (hereinafter, this mat is referred to as longest mat).

Even in the case that the holding sealing material 10 includes only these two mats 11 and 12, as illustrated in FIG. 1, the mat 11 is referred to as the "shortest mat" and the mat 12 is referred to as the "longest mat".

The full length L101 of the mat 11, which is the shortest mat, is determined such that the projection 13a and the recess 13b formed on the end portions are fitted to each other in the state the holding sealing material 10 is wound around the object. Therefore, the full length L101 of the shortest mat is substantially equal to the circumferential length of the object although some slight errors may occur due to the size difference between the object and the holding sealing material in use, the thickness of the mats, or the like.

Here, the term "full length" of a mat means the length of the side face of the mat, and the size of the projection and the recess formed on the end portions of the mat is not considered in the full length.

In the holding sealing material 10 of the present embodiment, the area of the projection 13a of the shortest mat (mat 11), which is to be closest to the object, is smaller than the area of the projection 14a of the longest mat (mat 12), which is to be farthest from the object.

Specifically, regarding the projection 13a of the mat 11 and the projection 14a of the mat 12, as illustrated in FIGS. 2 and 3, the length L11 of the projection 13a and the length L12 of the projection 14a are the same and the width W11 of the projection 13a is narrower than the width W12 of the projection 14a. Thus, the area of the projection 13a is smaller than the area of the projection 14a.

Regarding the recesses 13b and 14b, the length L1 of the recess 13b and the length L2 of the recess 14b are the same, and the width W1 of the recess 13b is narrower than the width W2 of the recess 14b.

In order to fit the projections 13a and 14a into the recesses 13b and 14b, respectively, the projections 13a and 14a and the recesses 13b and 14b are designed as follows: the length L11 of the projection 13a and the length L1 of the recess 13b are substantially the same, and the width W11 of the projection 13a and the width W1 of the recess 13b are also substantially the same; and similarly, the length L12 of the projection 14a and the length L2 of the recess 14b are substantially the same, and the width W12 of the projection 14a and the width W2 of the recess 14b are also substantially the same.

If the area of the projection 14a is, as described above, larger than the area of the projection 13a, in the case that the holding sealing material is wound around the object in a manner described later, overlap between mats is likely to be avoided and the holding sealing material 10 tends to be more successfully wound around the object, compared to the case that the projections of the mats 11 and 12 each have the same area. The area of the projection 13a of the shortest mat should be smaller than the area of the projection 14a of the longest mat, and for example, is preferably from about 30% to about 95% and more preferably from about 40% to about 90% of the area of the projection 14a of the longest mat. If the area of the projection 13a of the shortest mat is not less than about 30% of the area of the projection 14a of the longest mat, the projection 13a is never too small and therefore is less likely to cause difficulty when the projection 13a is fitted into the recess in the state that the holding sealing material is wound around the object. If the area of the projection 13a of the shortest mat is not larger than about 95% of the area of the projection 14a of the longest mat, it is easier to sufficiently obtain the above-mentioned effect of pressing the projection 13a by the projection 14a because the projections 13a and 14a have different sizes.

Hereinafter, examples of the combination of the projection 13a of the shortest mat (mat 11) and the projection 14a of the longest mat (mat 12) are described.

For example, the length L12 and the width W12 of the projection 14a of the longest mat are each represented by an index of 10. In the case that the proportions of the length L11 and the width W11 of the projection 13a of the shortest mat are 10 and 9.5, respectively, the area of the projection 13a of the shortest mat is 95% of the area of the projection 14a of the longest mat.

In the case that the proportions of the length L11 and the width W11 of the projection 13a of the shortest mat are 10 and 3 to those of the longest mat, respectively, the area of the projection 13a of the shortest mat is 30% of the area of the projection 14a of the longest mat.

As an example in which the projections 13a and 14a have different shapes from those described above, in the case that the proportions of the length and the width of the projection of the shortest mat are 9.5 and 10, respectively, to the length and the width of the projection of the longest mat which are each represented by an index of 10, the area of the projection of the shortest mat is 95% of the area of the projection of the longest mat. Similarly, in the case that the proportions of the length and the width of the projection of the shortest mat are 5 and 10, respectively, the area of the projection of the shortest mat is 50% of the area of the projection of the longest mat.

How the projection are fitted into the recesses in the state that the holding sealing material 10 is wound around the object will be described in detail below in the description of the method for winding the holding sealing material around an object to be wound.

The mats 11 and 12 of the holding sealing material 10 of the present embodiment are mats including inorganic fibers. These mats including inorganic fibers are able to maintain their shape to a certain degree owing to their entangled structure formed by the inorganic fibers. The mats including inorganic fibers are not particularly limited but are preferably needle mats.

The needle mats can be obtained by needle-punching a sheet product formed by compressing an inorganic fiber precursor, or alternatively by needle-punching a base mat including the inorganic fibers.

The needle mats include inorganic fibers having a comparatively long average fiber length, and these fibers are three-dimensionally entangled with one another by needle-punching. The average fiber length of the inorganic fibers may be, for example, from about 50 μm to about 100 mm.

The needle mats according to the present embodiment are needle-punched with needles arranged parallel to the width direction that is perpendicular to the longitudinal direction. These mats tend to improve the winding ability of the holding sealing material 10 to the object.

The holding sealing material 10 of the present embodiment may further contains a binder such as an organic binder in order to reduce the volume of the holding sealing material and enhance the working efficiency of pre-processes before winding the holding sealing material around the object.

The laminated mats are partially combined with one another at one or more fixed part. As illustrated in FIG. 1, the laminated mats 11 and 12 of the holding sealing material 10 of the present embodiment are fixed to each other at one fixed part 15. The fixed part 15 is formed by machine-sawing and serves to strongly fix the two mats 11 and 12 to each other.

As illustrated in FIG. 1, the fixed part 15 is spaced apart from each of the longer sides 21a and 22a of the mats 11 and 12 by a predetermined distance and continuously extends over from about 50% to about 99.5% of the length of the mat 11 in the width direction.

Here, both ends of the fixed part 15 are preferably spaced apart from the longer sides of the mats 11 and 12 but may extend to the longer sides of the mats 11 and 12 as long as the fixed part 15 does not cause any problem in use of the product.

Hereinafter, a method for winding the holding sealing material 10 of the present embodiment having the above structure around an object to be wound will be described.

Examples of the object include a catalyst carrier and an exhaust gas filter.

The holding sealing material of the present embodiment can be effectively wound around the object by a method including bringing the side with the recesses of the holding sealing material into contact with the object and then fitting the projections into the recesses. The following will explain how the projections are fitted into the recesses in the case of winding the holding sealing material around the object by such a method, with reference to FIGS. 4A, 4B, 5A and 5B.

Figure 4A:
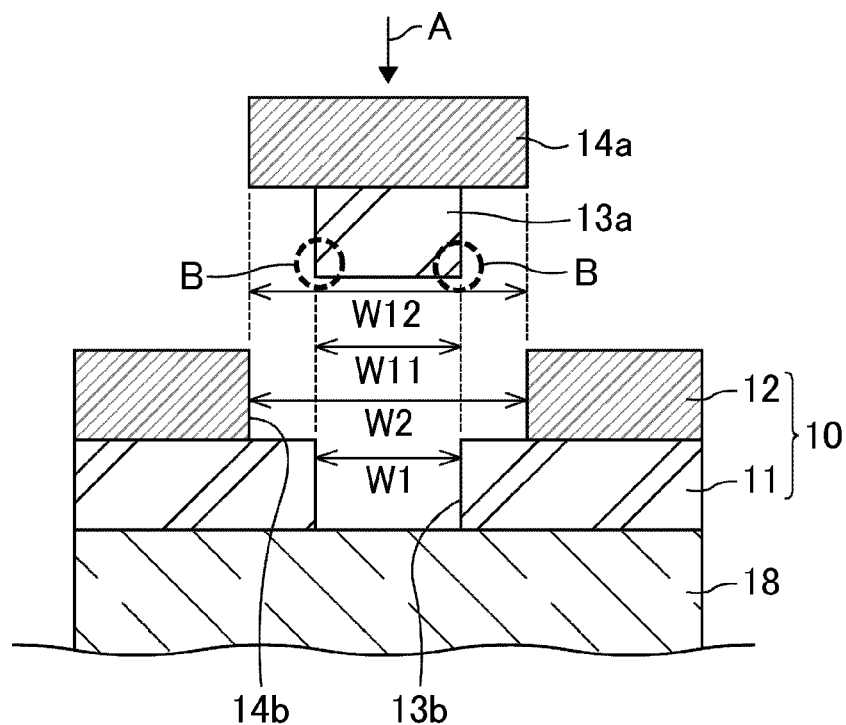
FIG. 4A is a schematic cross-sectional view along the thickness direction of the holding sealing material of the first embodiment of the present invention in the state that the holding sealing material is wound around an object to be wound with projections and recesses being about to be fitted to each other.
Figure 4B:
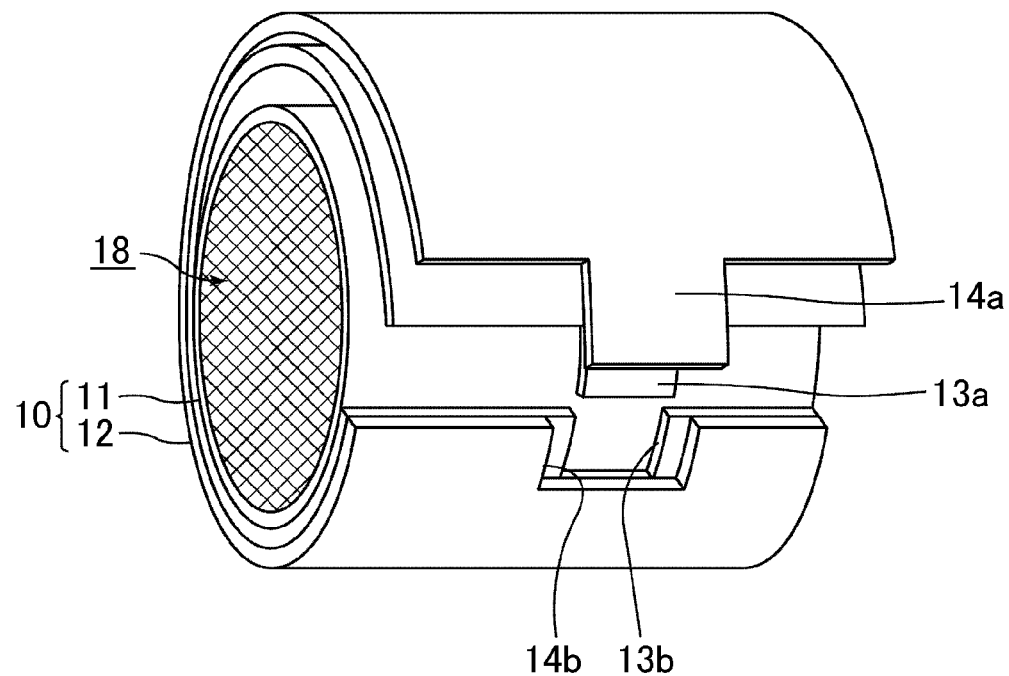
FIG. 4B is a schematic perspective view of the holding sealing material of the first embodiment of the present invention in the state that the holding sealing material is wound around the object with the projections and the recesses being about to be fitted to each other.

FIG. 4A is a schematic cross-sectional view along the thickness direction of the holding sealing material of the first embodiment of the present invention in the state that the holding sealing material is wound around the object with the projections and the recesses being about to fitted to each other, and FIG. 4B is a schematic perspective view of the holding sealing material of the first embodiment of the present invention in the state that the holding sealing material is wound around the object with the projections and the recesses being about to be fitted to each other.

Figure 5A:
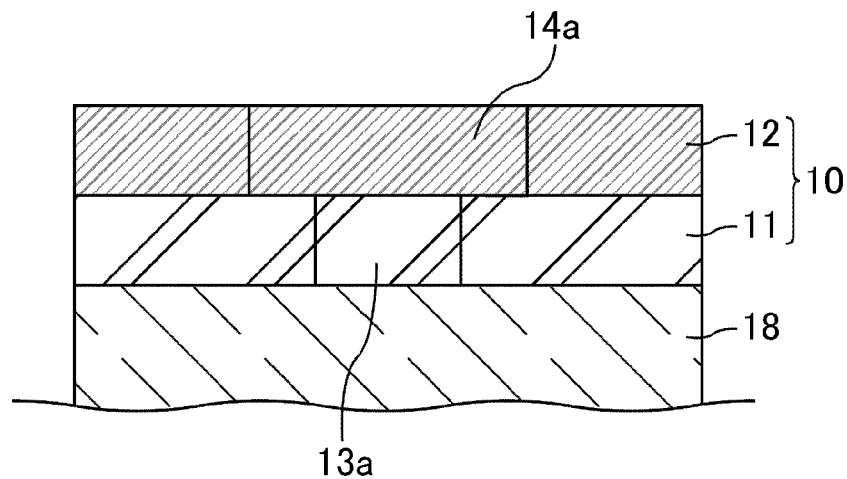
FIG. 5A is a schematic cross-sectional view along the thickness direction of the holding sealing material of the first embodiment of the present invention in the state the holding sealing material is wound around the object with the projections and the recesses fitted to each other.
Figure 5B:
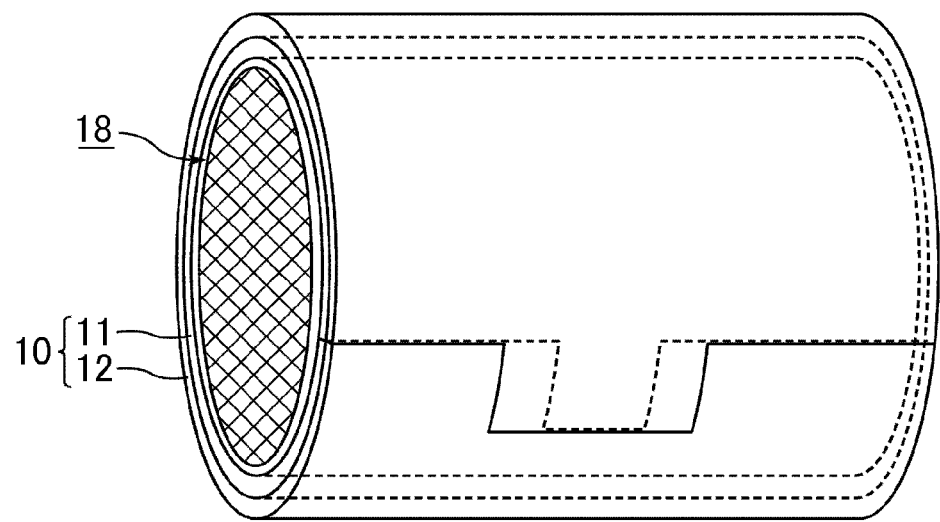
FIG. 5B is a schematic perspective view of the holding sealing material of the first embodiment of the present invention in the state that the holding sealing material is wound around the object with the projections and the recesses fitted to each other.

FIG. 5A is a schematic cross-sectional view along the thickness direction of the holding sealing material of the first embodiment of the present invention in the state that the holding sealing material is wound around the object with the projections and the recesses fitted to each other, and FIG. 5B is a schematic perspective view of the holding sealing material of the first embodiment of the present invention in the state of being wound around the object with the projections and the recesses fitted to each other.

As illustrated in FIGS. 4A and 4B, the side with the projection 13a of the mat 11 and the projection 14a of the mat 12 is brought into contact with the object 18 in such a manner that the mat 11 (shortest mat) is contacted with the object 18. Then, the projections 13a and 14a are pressed in the direction A to be fitted into the recesses 13b and 14b, respectively.

In this step, since the area of the projection 14a is larger than the area of the projection 13a, the projection 13a tends to be easily fitted into the recess 13b with stronger force, compared to a case that the area of the projection 14a and the area of the projection 13a are the same. For example, even if the corners of the projection 13a enclosed by the circles of broken lines B in FIG. 4A are caught by the corners of the area surrounding the recess 13b, this structure allows the projection 13a caught by the area surrounding the recess 13b to be released because the projection 13a is pressed with strong force by the projection 14a. Therefore, the projection 13a tends to be positively fitted into the recess 13b, as illustrated in FIGS. 5A and 5B.

Even in the case that the mats 11 and 12 are slightly dislocated in the width direction, since the width W12 of the projection 14a is wider than the width W11 of the projection 13a, the projection 14a tends to more positively cover the projection 13a, compared to the case that the area of the projection 14a and the area of the projection 13a are the same. In this way, the projection 13a tends to be positively fitted into the recess 13b in a similar manner to that described above.

Since, as illustrated in FIG. 4A, the width W11 of the projection 13a is narrower than the width W2 of the recess 14b, the projection 13a tends to easily pass through the recess 14b and to be easily pressed into the recess 13b without overlapping the area surrounding the recess 14b.

Accordingly, since the area of the projection 14a is larger than the area of the projection 13a, it is possible to release overlap between the mats such as overlap between the corners of the projection 13a enclosed by the circles of the broken lines B and the area surrounding the recess 13b illustrated in FIG. 4A. Therefore, the projection and the recess tend to be suitably fitted to each other, as illustrated in FIGS. 5A and 5B.

The mats 11 and 12 may be separately wound around the object 18 one by one, or both the two mats are simultaneously wound around the object 18 in order to improve the working efficiency.

Figure 6A:
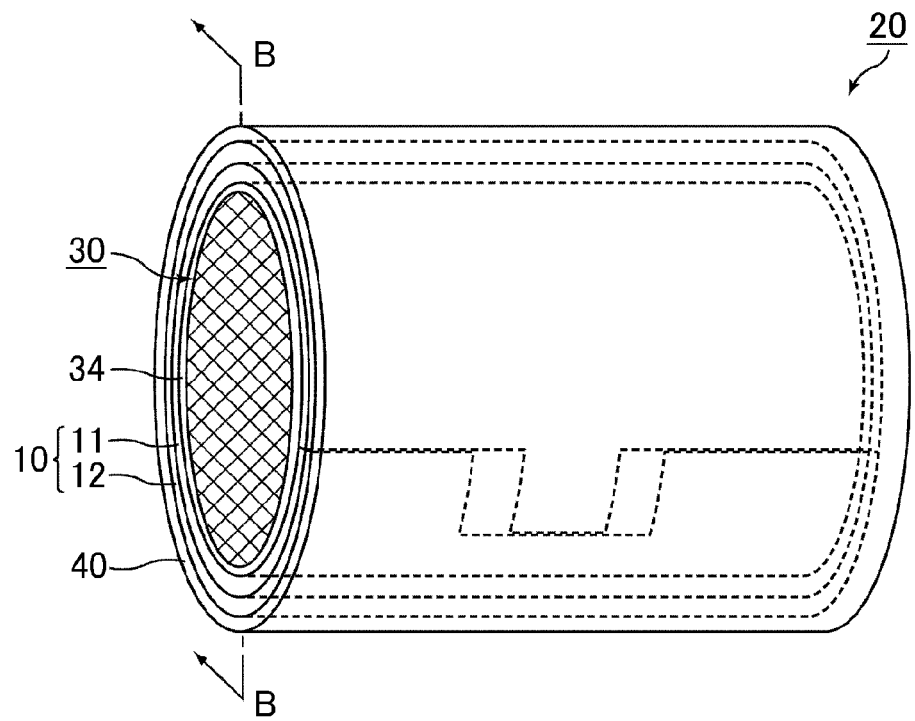
FIG. 6A is a perspective view schematically illustrating an exhaust gas purifying apparatus of the first embodiment of the present invention.
Figure 6B:
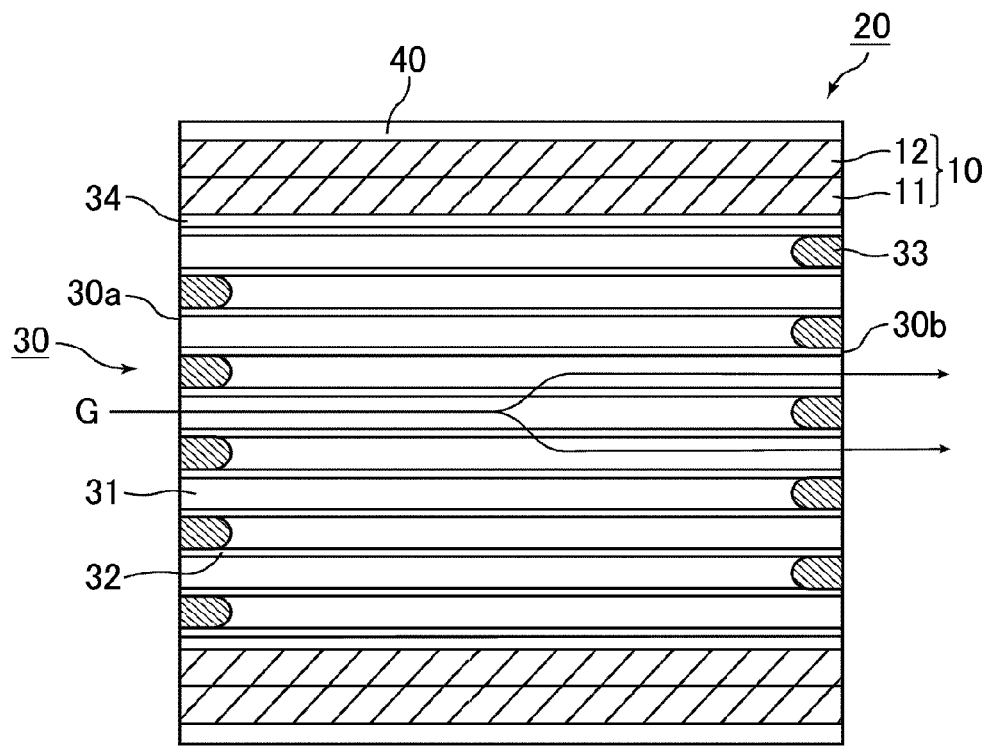
FIG. 6B is a B-B line cross-sectional view of the exhaust gas purifying apparatus illustrated in FIG. 6A.

The following will explain the structure of an exhaust gas purifying apparatus of the present embodiment provided with the holding sealing material of the present embodiment with reference to FIGS. 6A and 6B. In the present embodiment, an exhaust gas filter is used as an exhaust gas treating body which corresponds to the object 18 to be wound by the holding sealing material. FIG. 6A is a perspective view schematically illustrating the exhaust gas purifying apparatus of the first embodiment of the present invention. FIG. 6B is a B-B line cross-sectional view of the exhaust gas purifying apparatus illustrated in FIG. 6A.

As illustrated in FIGS. 6A and 6B, the exhaust gas purifying apparatus 20 includes: a pillar-shaped exhaust gas treating body 30 having a plurality of cells 31 longitudinally disposed in parallel with one another with a cell wall 32 interposed therebetween; a casing 40 accommodating the exhaust gas treating body 30; and the holding sealing material 10 disposed between the exhaust gas treating body 30 and the casing 40 to hold the exhaust gas treating body 30. If needed, to the ends of the casing 40 are connected: an introducing pipe for introducing exhaust gas discharged from an internal combustion engine; and an exhaust pipe through which exhaust gas that has passed through the exhaust gas purifying apparatus are discharged to the outside.

In the exhaust gas purifying apparatus 20 of the present embodiment, as illustrated in FIG. 6B, the exhaust gas treating body 30 is a honeycomb filter in which either one of ends of each cell is sealed with a plug 33. The honeycomb filter has a coat layer 34 on the periphery. The coat layer 34 is formed by drying and solidifying a sealing material paste.

The following will explain how exhaust gas passes through the exhaust gas purifying apparatus 20 having the above structure, with reference to FIG. 6B.

As illustrated in FIG. 6B, exhaust gas discharged from an internal combustion engine flows into the exhaust gas purifying apparatus 20 from one of the cells 31 with an opening on one end face 30a on the exhaust gas inlet side of the exhaust gas treating body 30 (honeycomb filter) and passes through the cell wall 32 separating the cells 31 (in FIG. 6B, G represents exhaust gas and the arrow represents flow of the exhaust gas.) At this time, the cell wall 32 captures PM in the exhaust gas. As a result, the exhaust gas is purified. The purified exhaust gas flows out through another cell 31 with an opening on the other end face 30b on the exhaust gas outlet side, and thus is discharged to the outside.

Figure 7A:
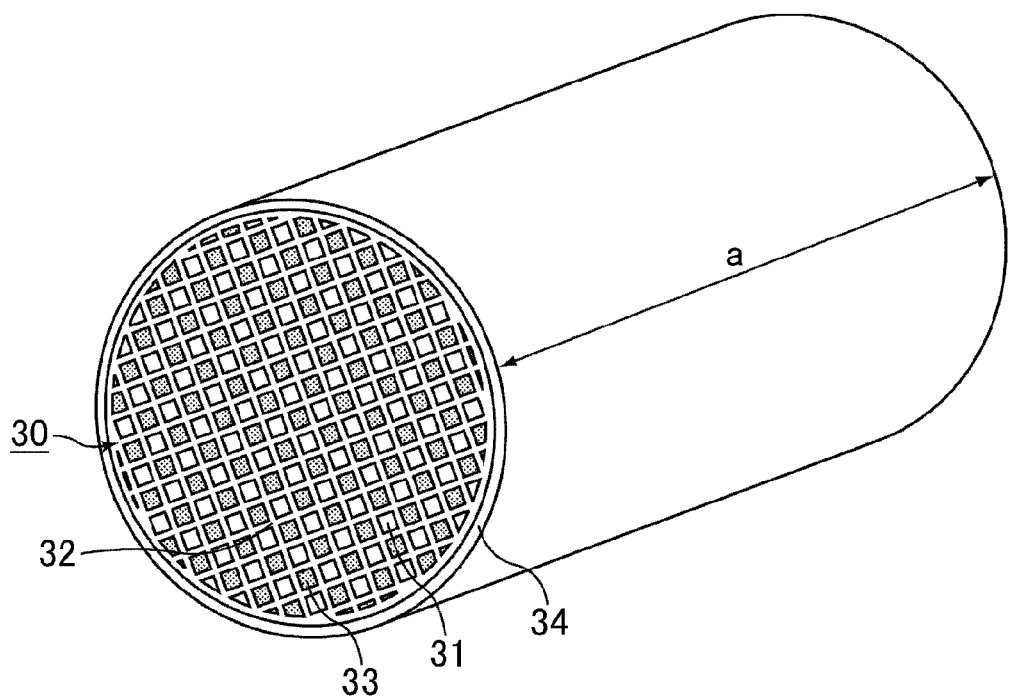
FIG. 7A is a perspective view schematically illustrating a honeycomb filter in the exhaust gas purifying apparatus of the first embodiment of the present invention.
Figure 7B:
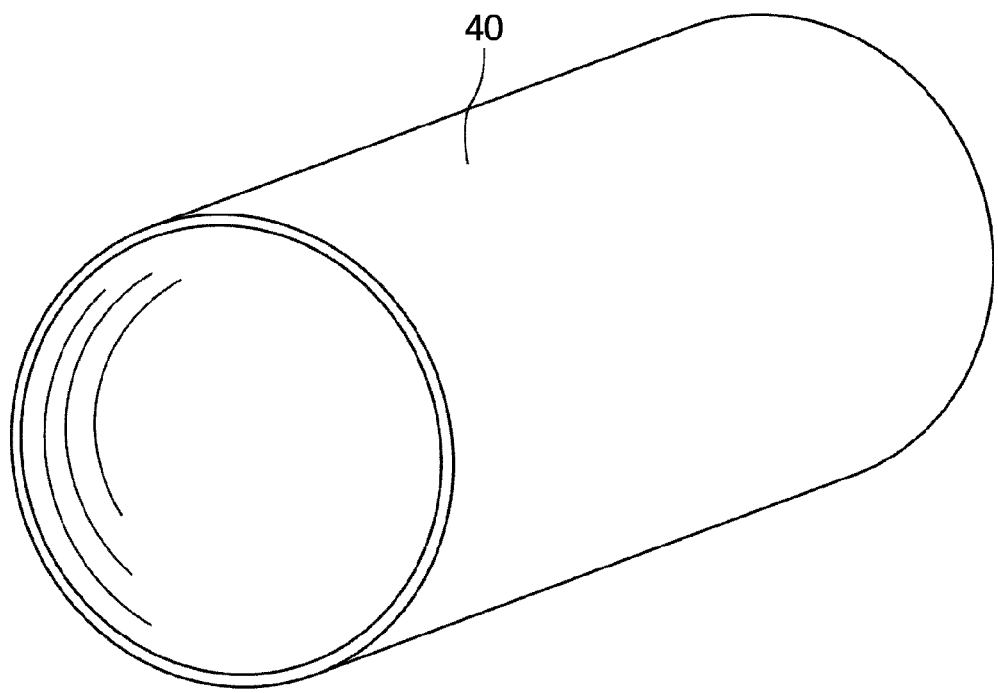
FIG. 7B is a perspective view schematically illustrating a casing in the exhaust gas purifying apparatus of the first embodiment of the present invention.

The following will describe the honeycomb filter and the casing in the exhaust gas purifying apparatus 20 with reference to FIGS. 7A and 7B. The holding sealing material 10 is not described below because it has already been described above.

FIG. 7A is a perspective view schematically illustrating the honeycomb filter in the exhaust gas purifying apparatus of the first embodiment of the present invention, and FIG. 7B is a perspective view schematically illustrating the casing in the exhaust gas purifying apparatus of the first embodiment of the present invention.

As illustrated in FIG. 7A, the honeycomb filter 30 is mainly made of porous ceramics and has a round pillar shape. The honeycomb filter 30 has the coating layer 34 on the periphery. The coating layer 34 functions to reinforce the periphery of the honeycomb filter 30, to adjust the shape of the honeycomb filter 30, and to improve the heat insulating property of the honeycomb filter 30.

The internal structure of the honeycomb filter 30 has already been stated in the description of the exhaust gas purifying apparatus of the present embodiment (see FIG. 6B).

The following will describe the casing 40. The casing 40, illustrated in FIG. 7B, is mainly made of metal such as stainless and has a circular cylindrical shape. The inner diameter of the casing 40 is slightly smaller than the total combined length of the diameter of the end face of the honeycomb filter 30 and the thickness of the holding sealing material 10 in the state of being wound around the honeycomb filter 30, and the length of the casing 40 is substantially the same as the length of the honeycomb filter 30 along the longitudinal direction (the direction indicated by a double-pointed arrow "a" in FIG. 7A).

The following description will describe methods for manufacturing the holding sealing material and the exhaust gas purifying apparatus of the present embodiment.

First, a method for manufacturing the holding sealing material will be described. In the method for manufacturing the holding sealing material of the present embodiment, mats to be laminated include a shortest mat and a longest mat. The shortest mat has a projection whose area is smaller than the area of a projection of the longest mat in a plan view. The mats include inorganic fibers and have a rectangular shape in a plan view. These mats are laminated on one another in an order such that the longitudinal length of the mats increases. The laminated mats are fixed to one another at one fixed part.

As the mats for the holding sealing material, needle mats are prepared. These needle mats each have a substantially rectangular shape with longer sides along the longitudinal direction and shorter sides substantially perpendicular to the longer sides in a plan view. The needle mats have predetermined full lengths and each have a recess on one of the shorter sides and a projection on the other shorter side. The needle mats can be prepared, for example, as follows:

spinning a spinning mixture containing at least an inorganic compound and an organic polymer to manufacture an inorganic fiber precursor;

compressing the inorganic fiber precursor to manufacture a sheet product;

performing a needle-punching treatment on the sheet product from at least one of the surfaces of the sheet product to form a sheet product including closed loops of bundles of the inorganic fiber precursor arranged along the at least one surface; and firing the sheet product to decompose and burn the organic polymer contained in the inorganic fiber precursor. Through these processes, needle mats including inorganic fibers entangled with one another can be manufactured.

Alternatively, the needle mats can be formed by needle-punching a base mat. In the base mat, inorganic fibers having a predetermined average fiber length are loosely entangled with one another through a spinning process. By carrying out the needle-punching treatment on the inorganic fibers thus loosely entangled with one another, the inorganic fibers are entangled with one another complicatedly. The resulting mat has an entangled structure that can maintain its shape to a certain degree without the presence of binders. Also usable are mats produced by laminating a mat including an inorganic fiber precursor and a base mat and needle-punching the laminated mats.

The inorganic fibers constituting the mats are not particularly limited and examples thereof include alumina-silica fibers, alumina fibers, and silica fibers. The inorganic fibers may be changed depending on the characteristics, properties and the like required for the holding sealing material (e.g. heat resistance, corrosion resistance and the like). In the case of using alumina-silica fibers as the inorganic fibers, fibers having a composition ratio of alumina to silica of from about (60:40) to about (80:20) may be used.

The needle-punching treatment may be performed by using a needle-punching apparatus. The needle-punching apparatus includes a supporting plate for supporting a mat to be treated (hereinafter, also referred to as treating mat); and a needle board disposed above the supporting plate and being reciprocally movable in the sticking direction (the thickness direction of the mat). The needle board has a large number of needles attached thereto. The needle board is moved toward and away from the treating mat disposed on the supporting plate such that the many needles are stuck into and took away from the treating mat. As a result, the inorganic fibers in the treating mat can be entangled complicatedly. The number of the needle-punching treatments and the number of the needles can be altered in accordance with the desired bulk density, weight per unit area, and the like.

In the case that the needle-punching treatment is performed on the sheet product obtained by compressing the inorganic fiber precursor, a plurality of needles are allowed to pass through the sheet product, which will be fired to form a mat, from one surface to the other surface so as to form a sheet product in which the inorganic fiber precursor, which will be fired to be converted into inorganic fibers, are entangled with one another.

The needle-punching treatment is performed on a plurality of treating mats each having a different length so as to prepare mats required for the holding sealing material according to the embodiment of the present invention.

The shortest mat, which will be directly wound around the exhaust gas treating body (honeycomb filter), has a full length that corresponds to the circumferential length of the exhaust gas treating body. Therefore, the full length of the shortest mat is determined first of all based on the circumferential length of the exhaust gas treating body. Subsequently, the full length of a mat, which will be located outside of the shortest mat, is determined based on the fact that the full length of this mat corresponds to the circumferential length calculated from the total of the diameter of the exhaust gas treating body and the thickness of the shortest mat in the state of being wound around the exhaust gas treating body. The full length of each mat to be laminated is determined by repeating this procedure.

Here, the term "full length" of a mat means the length of the side face of the mat, and the size of the projection and the recess to be formed on the end portions of the mat is not considered in the full length. The size of the projection and the recess formed on the ends of each mat is appropriately determined such that the projection of the shortest mat has a smaller area than the projection of the longest mat in a plan view.

Thereafter, a binder is applied to the needle-punched mats, if needed. The binder applied to the mats reinforces the entangled structure formed by the inorganic fibers and reduces the volume of the mats.

An emulsion, prepared by dispersing acrylic latex, rubber latex, or the like in water, may be used as the binder. This binder is sprayed evenly over each mat by using a spray or the like so that the binder is allowed to adhere to the mat.

Thereafter, in order to remove moisture contained in the binder, the mats are dried. The drying conditions are, for example, from about 1 minute to about 30 minutes at from about 95° C. to about 150° C. The mats of the present embodiment can be manufactured through the drying process.

The plurality of mats thus prepared are laminated in an order such that the length of the mats increases or decreases. The number of mats to be laminated can be changed depending on the holding ability and warming performance that are required for the holding sealing material. A typical exemplary lamination procedure is as follows: the mat with the longest full length is initially set; and other mats are sequentially laminated on one another in an order such that the full length of the mats decreases. The relative positions of the mats to be laminated may be such that: an upper mat having a shorter full length may be laminated on a lower mat having a longer full length so as not to stick out of either one of the ends of the lower mat located below the upper mat; or these mats may be displaced in the longitudinal direction such that the upper mat sticks out of either one of the ends of the lower mat having a longer full length.

The procedure to laminate the mats is not limited to those described above, and the mats may be laminated in a manner different from the above lamination procedures.

Next, the laminated mats are fixed to one another. The mats are fixed to one another by performing a fixing treatment such as machine-sewing on the laminated mats at one position. In the case that the fixed part is formed by machine-sewing, for example, the following procedures are performed: lock stitching with a stitch length of about 10 mm with a purplish red sewing thread having a diameter of about 1 mm and a Z twist as a second twist; and reverse stitching in the end portions of the fixed part.

In the case that the fixed part is formed by machine-sewing, these mats are fixed after lamination of these mats. In the case that the fixed part is formed using an adhesive, for example, a mark may be put on a position corresponding to the fixed part (for example, by standing a stick in parallel with the lamination direction at the position corresponding to the fixed part on a side of the mat, and the like), and then each pair of mats in contact with each other may be sequentially fixed with an adhesive along this mark.

With reference to the figure, the following description will discuss a method for manufacturing the exhaust gas purifying apparatus.

Figure 8:
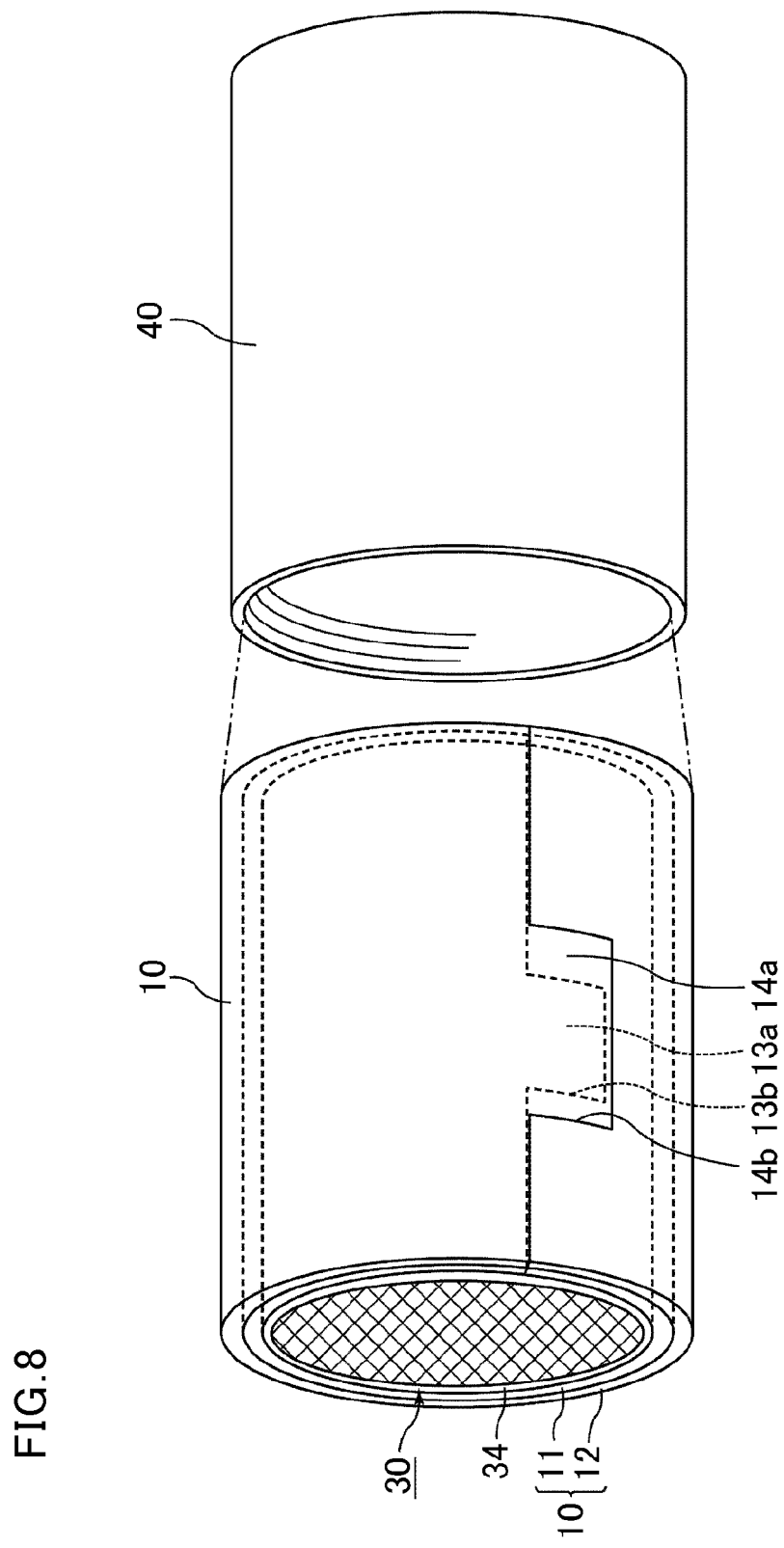
FIG. 8 is a perspective view schematically illustrating a procedure of manufacturing the exhaust gas purifying apparatus of the first embodiment of the present invention.

FIG. 8 is a perspective view schematically illustrating a procedure of manufacturing the exhaust gas purifying apparatus of the first embodiment of the present invention.

The holding sealing material 10, manufactured through the above processes, is wound around the periphery of the round pillar-shaped honeycomb filter 30 with the coat layer 34 formed by a conventionally known method, and the projections 13a and 14a are fitted into the recesses 13b and 14b, respectively. The mats 11 and 12 constituting the holding sealing material 10 may be separately wound one by one, or both may be wound at the same time. Then, as illustrated in FIG. 8, the honeycomb filter 30 covered with the holding sealing material 10 is stuffed into the round pillar-shaped casing 40 having a predetermined size and mainly made of metal or the like; thus, an exhaust gas purifying apparatus is manufactured.

In order to compress the holding sealing material upon the stuffing to obtain a predetermined repulsive force (i.e. force for holding the honeycomb filter 30), the internal diameter of the casing 40 is designed to be slightly smaller than the outermost diameter of the honeycomb filter 30 covered with the holding sealing material 10 including the thickness of the holding sealing material 10.

In the holding sealing material of the present embodiment, since the projection of the shortest mat has a smaller area than the projection of the longest mat, it is easier to prevent the projection of the shortest mat from overlapping a part of the area surrounding the recess or another mat when the holding sealing material is wound around the honeycomb filter.

In addition, since the mats are fixed to one another at the fixed part, dislocation between the mats in the width direction does not occur when the holding sealing material is wound around the honeycomb filter (exhaust gas treating body), and therefore the handleability of the mats are good. Accordingly, the production efficiency of the exhaust gas purifying apparatus is likely to be improved because the holding sealing material does not require any care for dislocation between the mats.

Although the present embodiment is described above with an example of the holding sealing material having two mats in which the projection of the shortest mat has a smaller area than the projection of the longest mat, as illustrated in FIG. 1, the present embodiment is not limited to this example. The holding sealing material of the present embodiment may have three or more mats. In the case of three or more mats, the projections of the mats may be designed such that the area of the projections sequentially decreases from the longest mat to the shortest mat.

In addition, although in the example described above, all the mats have the same width W and thickness T, the present embodiment is not limited to this, and the laminated mats may each have a different width W and/or a different thickness T.

Further, in the example described above, the projections and the recesses of the mats are all completely fitted to each other but the present invention is not limited to this. There may be a minute gap between peripheral faces of a projection and faces defining a recess in the state that the projections and the recesses are fitted to each other. This gap is formed, in particular along the longitudinal direction between the projection and the recess fitted to each other.

Furthermore, in the example described above, the mats constituting the holding sealing material are all needle mats, but the present embodiment is not limited to this. The mats constituting the holding sealing material may be base mats on which the needle-punching treatment is not performed, or sheet-processed mats including sheet-processed inorganic fibers and a binder. These needle mats, base mats and sheet-processed mats may be used alone or two or more types of these may be used in combination.

The effects of the holding sealing material, the method for winding the holding sealing material around an object to be wound and the exhaust gas purifying apparatus of the present embodiment are listed below.

(1) In the holding sealing material of the present embodiment, the projection of the mat to be closest to an object to be wound has a smaller area than the projection of the mat to be farthest from the object. This structure is likely to enable the projection of the mat farthest from the object to press the projection of the mat closest to the object into the recess with stronger force when the holding sealing material is wound around the object, compared to conventional ones in which a plurality of mats each have a projection of the same area. Therefore, this structure is likely to enable the projection of the mat closest to the object to be successfully fitted into the recess even if this mat, which is located inward of the other mat, is difficult to see. Consequently, it becomes easier to reduce the probability of overlap between a part of the projection and the area surrounding the recess or the other mat. Even if the mats are dislocated in the width direction of the mats, the projection of the mat farthest from the object is more likely to overlap the projection of the mat closest to the object, compared to that in conventional cases where a plurality of mats each have a projection of the same area. This is because the projection of the mat farthest from the object has a larger area than the projection of the mat closest to the object. In this way, it becomes easier to reduce the probability of overlap between mats. Accordingly, in the case that the holding sealing material of the present embodiment is used for an exhaust gas treating body such as a catalyst carrier or an exhaust gas filter, the holding sealing material tends to positively prevent exhaust gas leakage.

(2) In the holding sealing material of the present embodiment, the fixed part for combining the mats extends along the width direction perpendicular to the longitudinal direction of the mats, that is, extends along the direction perpendicular to the direction in which the holding sealing material is wound around the exhaust gas treating body. Owing to this structure, the holding sealing material tends to avoid difficulty caused by tensile stress generated, in particular, in the outer surface when the holding sealing material is wound around the object. Accordingly, this structure is likely to ensure the winding ability of the holding sealing material. In addition, this structure tends to prevent the mats from curling up from the longer sides of the mats, and more positively prevent dislocation between mats.

(3) In the holding sealing material of the present embodiment, the fixed part is spaced apart from at least one of the longer sides of each mat. Since the fixed part does not extend over the mats along the width direction, the mats do not require a fixing treatment on the longer sides. In addition, it becomes easier to prevent stress concentration and thereby to prevent damage to the mats.

(4) Since the mats of the holding sealing material of the present embodiment are needle-punched, the mats are less likely to break down and tend to maintain their shape to a certain degree. If the mats are needle-punched in the width direction perpendicular to the longitudinal direction, creases are formed in a needle-punched area along the width direction of the mats. In this case, the holding sealing material tends to be easily wound around the object.

(5) In the holding sealing material of the present embodiment, the inorganic fibers include a complex of alumina and silica. This holding sealing material is likely to be excellent in properties such as heat resistance and elasticity, and thereby tends to exhibit excellent performances such as ability to hold the object.

(6) The method for winding the holding sealing material of the present embodiment includes: winding the holding sealing materials the present embodiment around the object, the winding including: bringing the side with the recesses of the holding sealing material into contact with the object, and fitting the projections into the recesses. This method is likely to enable to suitably wind the holding sealing material around the object.

(7) Since the exhaust gas purifying apparatus of the present embodiment includes the holding sealing material of the present embodiment, it is easier to avoid tensile stress on the outer surface and wrinkles on the inner surface of the holding sealing material when the holding sealing material is wound around the exhaust gas treating body. Consequently, the exhaust gas purifying apparatus as a whole tends to avoid problems such as exhaust gas leakage and reduction in durability.

Second Embodiment

The following will discuss a second embodiment, which is one embodiment of the holding sealing material, the method for winding the holding sealing material around an object to be wound, and the exhaust gas purifying apparatus of the present invention, with reference to the figures.

The present embodiment is described with an example in which the projections and the recesses formed on the end portions of the mats have different shapes from those of the first embodiment of the present invention. Here, the detailed description of the other features is omitted because they are the same as those described above in the first embodiment of the present invention.

Figure 9:
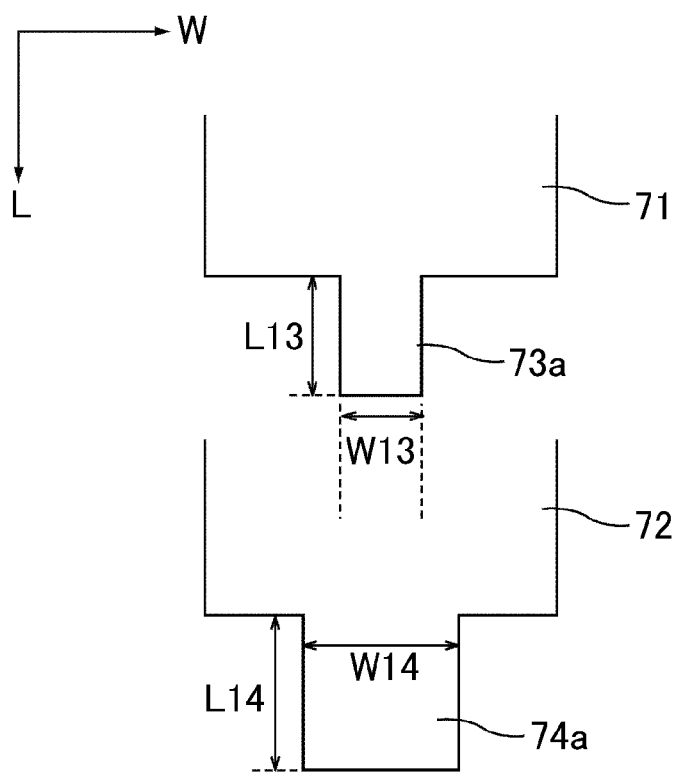
FIG. 9 is a plan view illustrating end portions of a shortest mat and a longest mat of a holding sealing material of a second embodiment of the present invention.

FIG. 9 is a plan view illustrating end portions of a shortest mat and a longest mat of a holding sealing material of the second embodiment of the present invention. Regarding to a plurality of mats of the holding sealing material of the present embodiment, as illustrated in FIG. 9, the length L13 of a projection 73a projecting in the longitudinal direction of the shortest mat 71 is shorter than the length L14 of a projection 74a projecting in the longitudinal direction of the longest mat 72, and the width W13 of the projection 73a of the shortest mat 71 is narrower than the width W14 of the projection 74a of the longest mat 72. Thus, the area of the projection 73a of the shortest mat 71 is smaller than the area of the projection 74a of the longest mat 72. Here, each mat has a recess with a shape that allows the recess to be fitted to the projection of the mat.

In order to easily wind the holding sealing material around the object, the length L13 of the projection 73a projecting in the longitudinal direction of the shortest mat 71 is preferably from about 30% to about 95% of the length L14 of the projection 74a projecting in the longitudinal direction of the longest mat 72. The width W13 of the projection 73a of the shortest mat 71 is preferably from about 30% to about 95% of the width W14 of the projection 74a of the longest mat 72. The area of the projection 73a of the shortest mat is preferably from about 30% to about 95%, and more preferably from about 40% to about 90% of the area of the projection 74a of the longest mat.

If the length L13 of the projection 73a is not less than about 30% of the length L14 of the projection 74a, the projection 73a is never too short in length and therefore is less likely to cause difficulty when the projection 73a is fitted into the recess in the state that the holding sealing material is wound around the object. If the length L13 of the projection 73a is not more than about 95% of the length L14 of the projection 74a, the projection 74a tends to sufficiently exhibit the above-mentioned effect of pressing the projection 73a because the projections 73a and 74a have different lengths. If the area of the projection 73a is not less than about 30% of the area of the projection 74a, the projection 73a is never too small in area and therefore is less likely to cause difficulty when the projection 73a is fitted into the recess in the state that the holding sealing material is wound around the object. If the area of the projection 73a is not more than about 95% of the area of the projection 74a, it may be easier to sufficiently obtain the above-mentioned effect of pressing the projection 73a by the projection 74a when the holding sealing material is wound around the object because the projections 73a and 74a have different areas.

Hereinafter, examples of the combination of the projection 73a of the shortest mat 71 and the projection 74a of the longest mat 72 are described.

For example, the length L14 and the width W14 of the projection 74a of the longest mat 71 are each represented by an index of 10. In the case that the proportions of the length L13 and the width W13 of the projection 73a of the shortest mat are 6 and 9, respectively, the area of the projection 73a of the shortest mat is 54% of the area of the projection 74a of the longest mat. In the case that the proportions of the length L13 and the width W13 of the projection 73a of the shortest mat are 9 and 9, respectively, the area of the projection 73a of the shortest mat is 81% of the area of the projection 74a of the longest mat. In the case of the proportions of the length L13 and the width W13 of the projection 73a of the shortest mat are 9 and 4, respectively, the area of the projection 73a of the shortest mat is 36% of the area of the projection 74a of the longest mat.

The present embodiment can also exhibit the above-mentioned effects (1) to (7) described in the first embodiment of the present invention.

Third Embodiment

The following will discuss a third embodiment, which is one embodiment of the holding sealing material, the method for winding the holding sealing material around an object to be wound, and the exhaust gas purifying apparatus of the present invention, with reference to the figures.

The present embodiment is described with an example in which the projections and the recesses formed on the end portions of the mats have different shapes from those of the first embodiment of the present invention. Here, the detailed description of the other features is omitted because they are the same as those described above in the first embodiment of the present invention.

Figure 10:
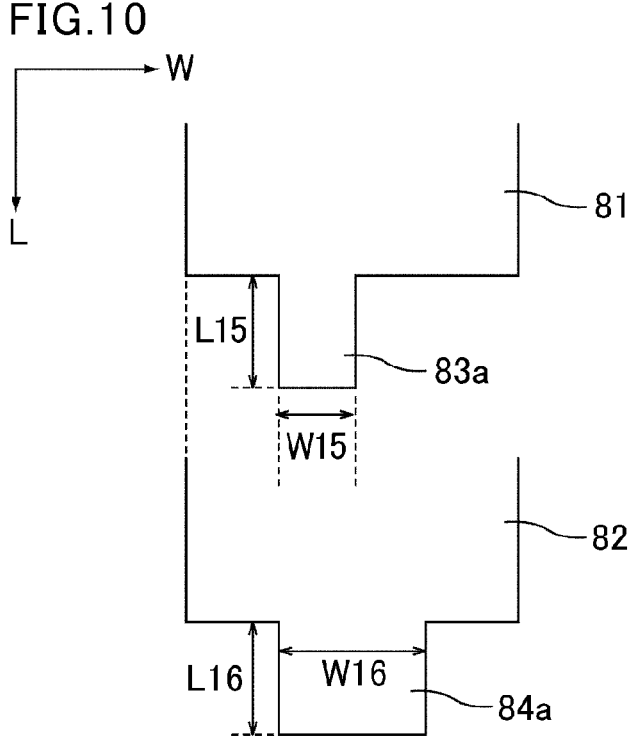
FIG. 10 is a plan view illustrating end portions of a shortest mat and a longest mat of a holding sealing material of a third embodiment of the present invention.

FIG. 10 is a plan view illustrating end portions of a shortest mat and a longest mat of a holding sealing material of the third embodiment of the present invention. As illustrated in FIG. 10, the shortest mat 81 and longest mat 82 have a projection 83a and a projection 84a, respectively, that are located such that one side of each projection projecting along the longitudinal direction of the mats overlies that of the other projection in the state that the holding sealing material is wound around the object. The width W15 of the projection 83a is narrower than the width W16 of the projection 84a, and thereby, the area of the projection 83a of the shortest mat 81 is smaller than the area of the projection 84a of the longest mat 82. The length L15 of the projection 83a of the shortest mat 81 and the length L16 of the projection 84a of the longest mat 82 are substantially the same. Here, each mat has a recess with a shape that allows the recess to be fitted to the projection of the mat.

As described above, in order to easily wind the holding sealing material around the object, the width W15 of the projection 83a of the shortest mat 81 is preferably from about 30% to about 95% of the width W16 of the projection 84a of the longest mat 82.

If the width W15 of the projection 83a of the shortest mat is not less than about 30% of the width W16 of the projection 84a of the longest mat 82, the projection 83a is never too narrow in width and therefore is less likely to cause difficulty when the projection 83a is fitted into the recess in the state that the holding sealing material is wound around the object. If the width W15 of the projection 83a is not more than about 95% of the width W16 of the projection 84a, the projection 84a tends to sufficiently exhibit the above-mentioned effect of pressing the projection 83a because the projections 83a and 84a have different widths.

Although in the above example, the length L15 of projection 83a of the shortest mat 81 and the length L16 of projection 84a of the longest mat 82 are the same, the projections may each have a different length. In this case, the length of the projection of the shortest mat is preferably from about 30% to about 95% of the length of the projection of the longest mat.

If the length of the projection of the shortest mat is not less than about 30% of the length of the projection of the longest mat, the projection of the shortest mat is never too short in length and is less likely to cause difficulty when the projection is fitted into the recess in the state that the holding sealing material is wound around the object. If the length of the projection of the shortest mat is not more than about 95% of the length of the projection of the longest mat, the above-mentioned effect tends to be sufficiently exerted because the projections of the shortest mat and the longest mat have different lengths. Accordingly, in order to wind the holding sealing material around the object with high working efficiency, the length of the projection of the shortest mat is preferably from about 30% to about 95% of the length of the projection of the longest mat.

The present embodiment can also exhibit the above-mentioned effects (1) to (7) described in the first embodiment of the present invention.

Fourth Embodiment

The following will discuss a fourth embodiment, which is one embodiment of the holding sealing material, the method for winding the holding sealing material around an object to be wound, and the exhaust gas purifying apparatus of the present invention, with reference to the figures.

The present embodiment is described with an example in which the projections and the recesses formed on the end portions of the mats have different shapes from those of the first embodiment of the present invention. Here, the detailed description of the other features is omitted because they are the same as those described above in the first embodiment of the present invention.

Figure 11:
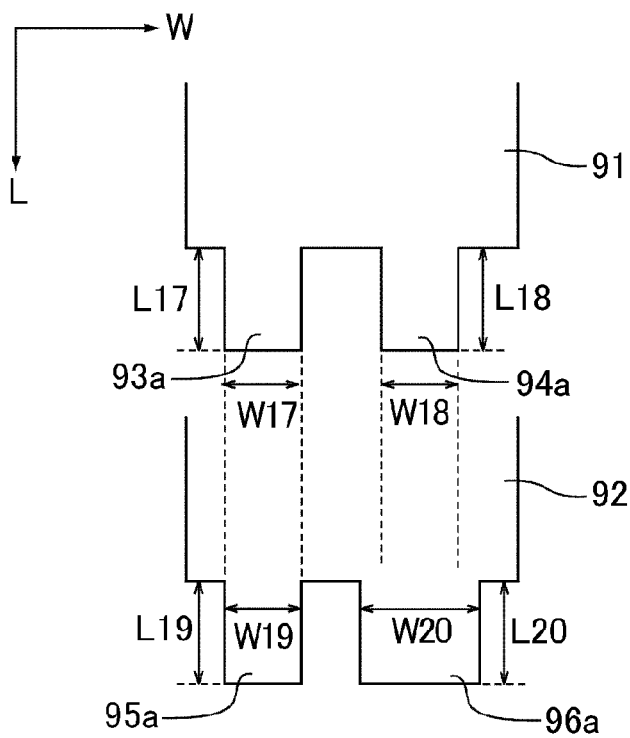
FIG. 11 is a plan view illustrating end portions of a shortest mat and a longest mat of a holding sealing material of a fourth embodiment of the present invention.

FIG. 11 is a plan view illustrating end portions of a shortest mat and a longest mat of a holding sealing material of the fourth embodiment of the present invention. In the holding sealing material of the present embodiment, as illustrated in FIG. 11, the shortest mat 91 and longest mat 92 have multiple projections. Specifically, the shortest mat 91 has two projections 93a and 94a, and the longest mat 92 also has two projections 95a and 96a.

Here, the projection 93a of the shortest mat 91 and the projection 95a of the longest mat 92 have the same shape. Specifically, the length L17 and the width W17 of the projection 93a are the same as the length L19 and the width W19 of the projection 95a, respectively. The projection 93a and the projection 95a are located such that one side of each projection along the longitudinal direction overlies that of the other projection. Regarding the projection 94a of the shortest mat 91 and the projection 96a of the longest mat 92, the lengths L18 and L20 are the same but the width W18 of the projection 94a is narrower than the width W20 of the projection 96a. Thus, the area of the projection 94a of the shortest mat 91 is smaller than the area of the projection 96a of the longest mat 92. Here, each mat has recesses with shapes that allow the recesses to be fitted to the projections of the mat.

Also in the present embodiment, in order to easily wind the holding sealing material around the object, the length L18 of the projection 94a of the shortest mat 91 is preferably from about 30% to about 95% of the length L20 of the projection 96a of the longest mat 92. The width W18 of the projection 94a of the shortest mat 91 is preferably from about 30% to about 95% of the width W20 of the projection 96a of the longest mat 92.

If the length of the projection of the shortest mat is not less than about 30% of the length of the projection of the longest mat, the projection of the shortest mat is never too short in length and is less likely to cause difficulty when the projection is fitted into the recess in the state that the holding sealing material is wound around the object. If the length of the projection of the shortest mat is not more than about 95% of the length of the projection of the longest mat, the above-mentioned effect tends to be sufficiently exerted because the projections of the shortest mat and the longest mat have different lengths.

Likewise, if the width of the projection of the shortest mat is not less than about 30% of the width of the projection of the longest mat, the projection of the shortest mat is never too narrow in width and therefore is less likely to cause difficulty when the projection is fitted into the recess in the state that the holding sealing material is wound around the object. If the width of the projection of the shortest mat is not more than about 95% of the width of the projection of the longest mat, the above-mentioned effect tends to be sufficiently exerted because the projections of the shortest mat and the longest mat have different widths.

In the present embodiment, the number of projections of each mat is not particularly limited, and the mats each may have the same number of projections or a different number of projections. However, it is preferable that at least one projection of the shortest mat has a smaller area than a projection of the longest mat.

The present embodiment can also exhibit the above-mentioned effects (1) to (7) of the first embodiment of the present invention.

The following description will discuss Examples that disclose the first to fourth embodiments of the present invention in more detail. Here, the embodiments of the present invention are not limited only to these Examples.

Example 1

The following description of the present example will explain a holding sealing material that more specifically discloses the first embodiment of the present invention, that is, a holding sealing material with a projection having the shape illustrated in FIG. 3.

First, mats including alumina fibers were formed by the following procedures.

(1) Spinning on Precursor Fiber

To a basic aluminum chloride aqueous solution adjusted to have an Al (aluminum) content of 70 g/l and a ratio of Al:Cl (chlorine)=1:1.8 (atomic weight ratio) was added silica sol in a manner that the inorganic fibers after firing was set to have a compound ratio of $Al_2O_3$ (aluminum oxide):$SiO_2$ (silicon oxide)=72:28 (weight ratio). Thereafter, a proper amount of an organic polymer (polyvinyl alcohol) was further added thereto to prepare a mixed solution.

The resulting mixed solution was condensed to give a spinning mixture, and this spinning mixture was spun by a blowing method such that an inorganic fiber precursor having an average fiber diameter of 5 μm was manufactured.

The rate of the spinning mixture pressed out from a nozzle for supplying the spinning mixture by the blowing method was preferably from about 3 ml/h to about 50 ml/h. Under such a condition, the spinning mixture pressed out of the nozzle for supplying the spinning mixture will never be in a spray (fog) form and is sufficiently extended, and therefore the inorganic precursor is less likely to cause attachment between portions thereof. As a result, the obtained inorganic fiber precursor (inorganic fiber) was homogeneous and had a narrow fiber diameter distribution.

(2) Compression

Next, the inorganic fiber precursor obtained in the above spinning process was compressed to manufacture a continuous sheet product.

(3) Needle-Punching

Needle-punching was continuously performed on the sheet product obtained in the above compression process under the following conditions to manufacture a needle-punched mat.

First, a needle board to which needles were attached at a density of 21 pcs/cm$^2$ was prepared. Next, this needle board was placed above one of the surfaces of the sheet product, and needle-punching was carried out by allowing the needle board to descend and ascend once along the thickness direction of the sheet product; thus, a needle-punched mat was manufactured.

(4) Firing

The needle-punched mat obtained in the above needle-punching process was continuously fired at a maximum temperature of 1250° C.; thus, a fired sheet product formed by inorganic fibers including alumina and silica was manufactured. At each of the needle protrusion marks, closed loops of inorganic fiber bundles were observed. The area density of inorganic fiber bundles was 21 pcs/cm$^2$.

The average fiber diameter of the inorganic fibers was 5 μm, and the minimum value of the inorganic fiber diameter was 3.2 μm. The fired sheet product has an area density of needle marks of 21 pcs/cm$^2$, a weight per unit area (weight per square meter) of 1400 g/m$^2$, and a bulk density of 0.15 g/cm$^3$.

(5) Cutting

The fired sheet product obtained in the above firing process was cut into a cut-off sheet product.

(6) Impregnation

The cut-off sheet product obtained in the above cutting process was impregnated with an organic binder solution (acrylic latex) containing an acrylic resin serving as an organic binder; thus, an impregnated sheet product was manufactured.

(7) Drying

An excessive organic binder solution was removed by suction from the obtained impregnated sheet product, and then the resulting product was dried under pressure; thus, a dried sheet product containing the organic binder was manufactured. Here, the amount of the organic binder contained in the obtained dried sheet product was 1% by weight.

(8) Shaping and Cutting

The dried needle-punched mat was cut into predetermined shapes such that two mats 11 and 12 (shortest mat and longest mat) each having a projection of the shape illustrated in FIG. 3 and a recess to be fitted to the projection were manufactured. The mat 11, which is the shortest mat, was manufactured as follows. First, the needle-punched mat was cut into a mat that has a size of 776 mm in full length×290 mm in width in a plan view, and has a projection 13a with a length L11 of 35 mm and a width W11 of 80 mm on one end and a recess to be fitted to the projection 13a on the other end.

Then, the needle-punched mat was cut into a mat that has a size of 799 mm in full length×290 mm in width in a plan view, and has a projection 14a with a length L12 of 35 mm and a width W12 of 100 mm and a recess to be fitted to the projection 14a, on the end portions. Except this, the mat 12 was manufactured in the same manner as described above. Both of the two mats thus manufactured had a thickness of 7.9 mm.

The two mats 11 and 12 thus manufactured were laminated such that the positions of the respective mats which equally divide the full length into two exactly coincided with each other.

Subsequently, one fixed part for combining the laminated mats together was formed. The fixed part was formed by machine-sewing such that the ends of the fixed part were spaced apart from the longer sides of the mats by 10 mm, and that the length of the fixed part was 270 mm.

Example 2

The following description of the present example will discuss a holding sealing material that discloses the second embodiment of the present invention in more detail, that is, a holding sealing material with a projection having the shape illustrated in FIG. 9.

A shortest mat 71 was cut out to have a size of 776 mm in full length×290 mm in width in a plan view, and have a projection 73a with a length L13 of 35 mm and a width W13 of 80 mm on one end and a recess to be fitted to the projection 73a on the other end. A longest mat 72 was designed to have a size of 799 mm in full length×290 mm in width in a plan view, and have a projection 74a with a length L14 of 40 mm and a width W14 of 100 mm and a recess with a shape that allows the recess to be fitted to the projection 74a. The holding sealing material was manufactured in the same manner as in Example 1, except that the shapes of the cut-out mats were changed as described above.

Example 3

The following description of the present example will discuss a holding sealing material that discloses the third embodiment of the present invention in more detail, that is, a holding sealing material with a projection having the shape illustrated in FIG. 10.

A shortest mat 81 was cut out to have a size of 776 mm in full length×290 mm in width in a plan view, and have a projection 83a with a length L15 of 35 mm and a width W15 of 80 mm on one end and a recess to be fitted to the projection 83a on the other end. A longest mat 82 was designed to have a size of 799 mm in full length×290 mm in width in a plan view, and have a projection 84a with a length L16 of 35 mm and a width W16 of 100 mm and a recess with a shape that allows the recess to be fitted to the projection 84a. The holding sealing material was manufactured in the same manner as in Example 1, except that the shapes of the cut-out mats were changed as described above.

Example 4

The following description of the present example will discuss a holding sealing material that discloses the fourth embodiment of the present invention in more detail, that is, a holding sealing material with projections having the shapes illustrated in FIG. 11 on one end portion of each mat.

A shortest mat 91 was cut out to have a size of 776 mm in full length×290 mm in width in a plan view, and have a projection 93a with a length L17 of 35 mm and a width W17 of 50 mm and a projection 94a with a length L18 of 35 mm and a width W18 of 70 mm on one end and recesses to be fitted to the projections 93a and 94a on the other end. A longest mat 92 was designed to have a size of 799 mm in full length×290 mm in width in a plan view, and have a projection 95a with a length L19 of 35 mm and a width W19 of 50 mm and a projection 96a with a length L20 of 35 mm and a width W20 of 90 mm and recesses with shapes that allow the recesses to be fitted to the projections 95a and 96a, respectively. The holding sealing material was manufactured in the same manner as in Example 1, except that the shapes of the end portions of the cut-out mats were changed as described above.

The following will discuss a comparative example for comparison with Examples 1 to 4 described above.

Comparative Example 1

Figure 12:
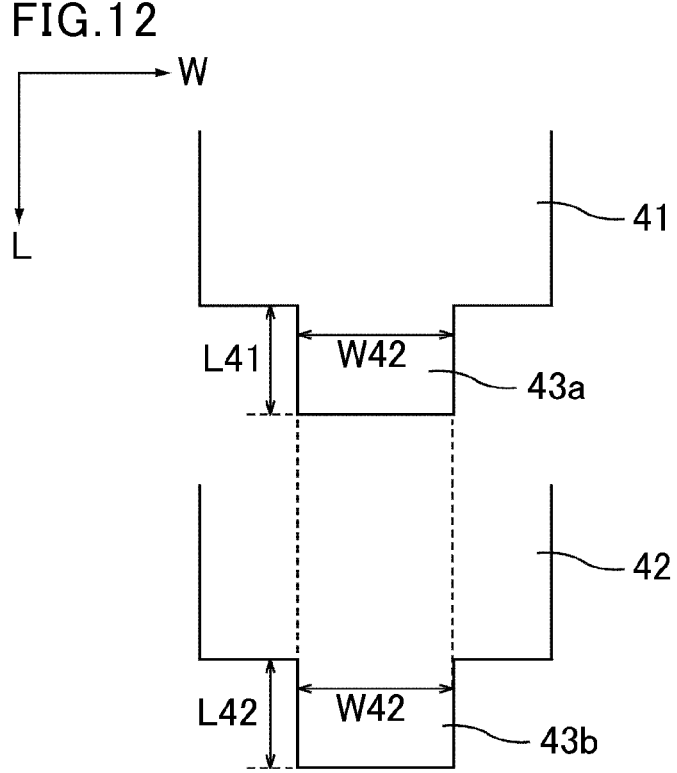
FIG. 12 is a plan view illustrating end portions of a shortest mat and a longest mat of a holding sealing material of Comparative Example 1.

FIG. 12 is a plan view illustrating end portions of a shortest mat and a longest mat of a holding sealing material of the comparative example.

In the present comparative example, the holding sealing material was manufactured in the same manner as in Example 1 except that, as illustrated in FIG. 12, a projection 43a on one end of the shortest mat 41 and a projection 43b on one end of the longest mat 42 have the same size and shape.

Specifically, the shortest mat 41 was cut out to have a size of 776 mm in full length×290 mm in width in a plan view, and have the projection 43a with a length L41 of 35 mm and a width W41 of 100 mm on one end and a recess to be fitted to the projection 43a on the other end. The longest mat 42 was designed to have a size of 799 mm in full length×290 mm in width in a plan view, and have the projection 43b with a length L42 of 35 mm and a width W42 of 100 mm and a recess to be fitted to the projection 43b on the other end. The holding sealing material was manufactured in the same manner as in Example 1, except that the shapes of the end portions of the cut-out mats were changed as described above.

The holding sealing materials manufactured in Examples 1 to 4 and Comparative Example 1 were evaluated by a winding ability test. The winding ability test was performed on these holding sealing materials each including two laminated mats, specifically by simultaneously winding two mats constituting a holding sealing material around an exhaust gas filter. After winding the holding sealing material, the holding sealing material was evaluated for the presence or absence of overlap between projections and recesses by visually observing the both end portions of the mats with the projections and the recesses fitted to each other.

Table 1 shows the results of the winding ability test of Examples 1 to 4 and Comparative Example 1. Specifically, Table 1 shows the shape of the projection(s) of the shortest mat, the shape of the projection(s) of the longest mat, the area proportion of the projection(s) of the shortest mat to the projection(s) of the longest mat, and the presence or absence of overlap in the mats.

TABLE 1

| | Projection of shortest mat | | | Projection of longest mat | | | Proportion of projection area of shortest mat to projection area of longest mat (%) | Overlap of mat |
|---|---|---|---|---|---|---|---|---|
| | Length [mm] | Width [mm] | Area [mm²] | Length [mm] | Width [mm] | Area [mm²] | | |
| Example 1 | 35 | 80 | 2800 | 35 | 100 | 3500 | 80 | Not observed |
| Example 2 | 35 | 80 | 2800 | 40 | 100 | 4000 | 70 | Not observed |
| Example 3 | 35 | 80 | 2800 | 35 | 100 | 3500 | 80 | Not observed |
| Example 4 | 35 | 50 | 4200 | 35 | 50 | 4900 | 85.7 | Not observed |
| | 35 | 70 | | 35 | 90 | | | |
| Comparative Example 1 | 35 | 100 | 3500 | 35 | 100 | 3500 | 100 | Observed in shortest mat |

Regarding to the holding sealing materials manufactured in Examples 1 to 4, since the projection of the shortest mat had a smaller area than the projection of the longest mat, the projection of the shortest mat was pressed into the recess with strong force by the projection of the longest mat even if the two mats were simultaneously wound around the exhaust gas filter, which is an object to be wound. Consequently, no overlap of the mats was observed in the state that the projections and the recesses were fitted to each other. Regarding to each mat, there was observed only a minute gap between the fitting portions of the recess and the projection, but the gap was small enough to avoid exhaust gas leakage in use of the product. Accordingly, these holding sealing materials could be wound around the exhaust gas filter with high working efficiency. It should be noted that such a minute gap as those observed in these holding sealing materials will be substantially filled when the holding sealing materials are stuffed into a casing in the state of being wound around an exhaust gas filter because the holding sealing materials are compressed and extended in the circumferential direction.

In contrast, the holding sealing material of Comparative Example 1 had an overlap in the shortest mat because the shortest mat and the longest mat were dislocated in the width direction when the two mats were simultaneously wound around the exhaust gas filter. This is because the projection of the shortest mat and the projection of the longest mat had the same area. In addition, there was observed a larger gap between the fitting portions of the recess and the projection of each mat, compared to those observed in the holding sealing materials of Examples described above.

Such a large gap will not be sufficiently filled even if the holding sealing material is extended in the circumferential direction when stuffed into a casing in the state of being wound around an exhaust gas filter. As a result, a part of the gap will remain unfilled and cause the problem of exhaust gas leakage.

Fifth Embodiment

The following will discuss a fifth embodiment which is one embodiment of the holding sealing material and the method for winding the holding sealing material around an object to be wound of the present invention, with reference to the figures. Here, components having the same features as those of the first embodiment of the present invention are indicated by the same reference signs and the description thereof is omitted. Since the structure of an exhaust gas purifying apparatus of the present embodiment is the same as that of the first embodiment of the present invention, except that the structure of the holding sealing material is different, the description thereof is also omitted.

Regarding to the area of projections of mats of the holding sealing material of the fifth embodiment of the present invention, a projection of a mat to be farthest from the object has a smaller area than a projection of a mat to be closest to the object, unlike the above-described holding sealing material of the first embodiment of the present invention. This embodiment is described with reference to FIGS. 13, 14A, 14B, 15A and 15B.

Figure 13:
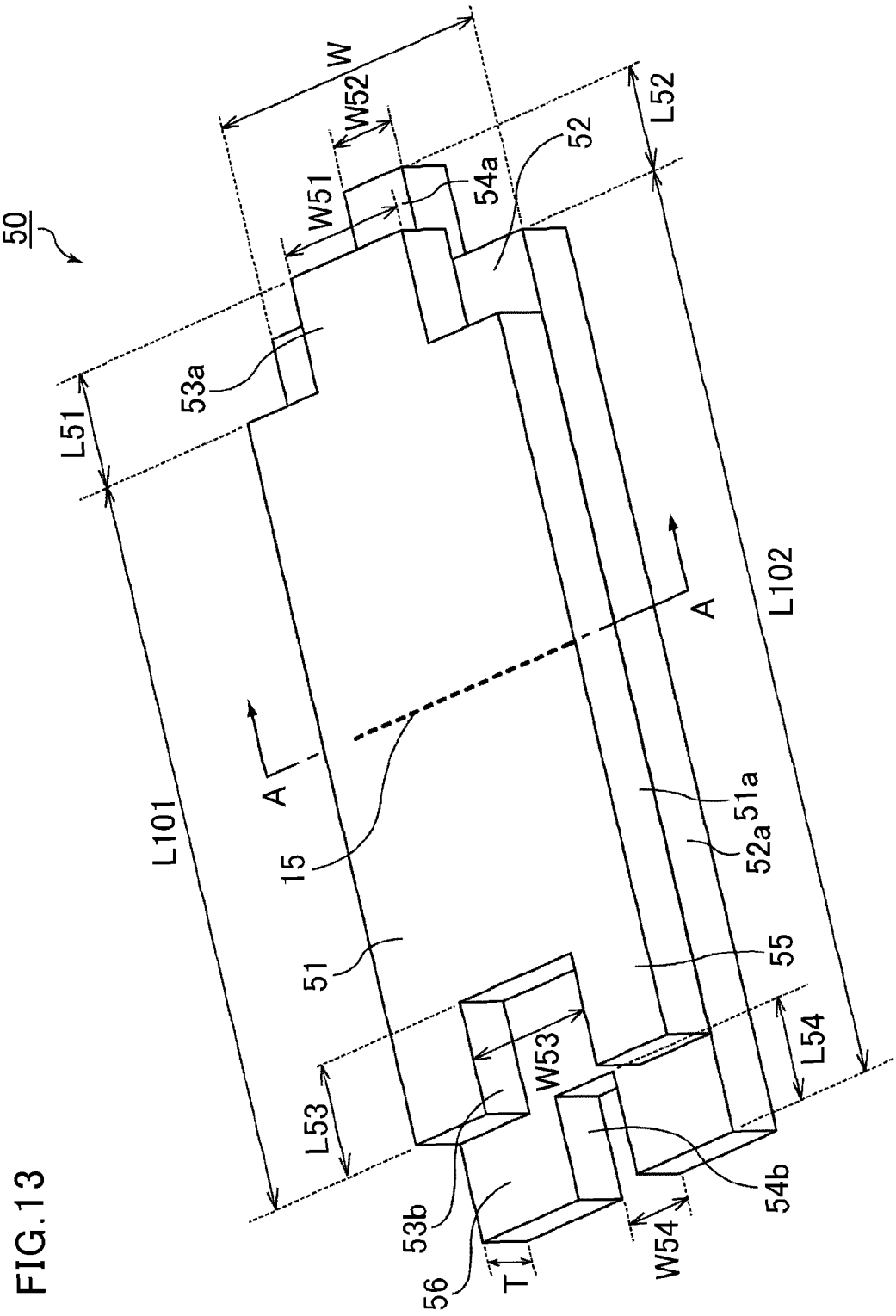
FIG. 13 is a perspective view schematically illustrating the structure of a holding sealing material of a fifth embodiment of the present invention.

FIG. 13 is a perspective view schematically illustrating the structure of the holding sealing material of the fifth embodiment of the present invention.

Figure 14A:
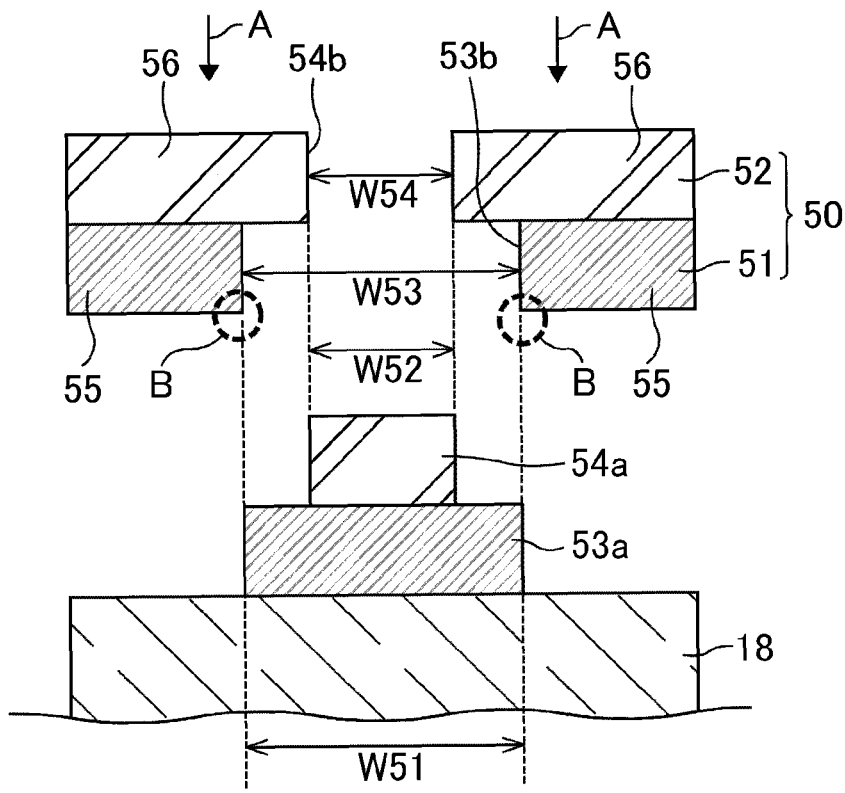
FIG. 14A is a schematic cross-sectional view along the thickness direction of the holding sealing material of the fifth embodiment of the present invention in the state that the holding sealing material is wound around an object to be wound with projections and recesses being about to be fitted to each other.
Figure 14B:
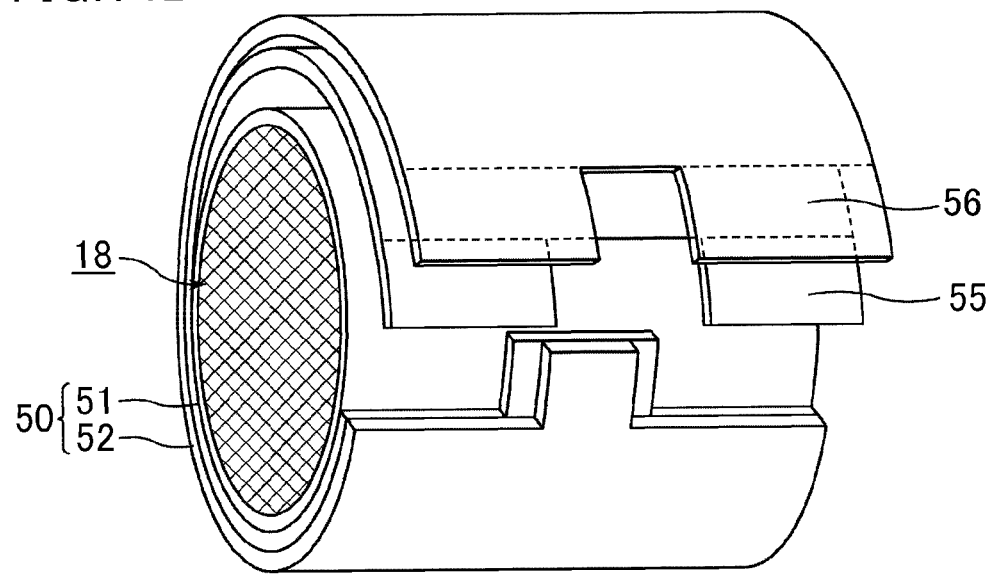
FIG. 14B is a schematic perspective view of the holding sealing material of the fifth embodiment of the present invention in the state that the holding sealing material is wound around the object with the projections and the recesses being about to be fitted to each other.

FIG. 14A is a schematic cross-sectional view along the thickness direction of the holding sealing material of the fifth embodiment of the present invention in the state that the holding sealing material is wound around the object with the projections and the recesses being about to be fitted to each other, and FIG. 14B is a schematic perspective view of the holding sealing material of the fifth embodiment of the present invention in the state that the holding sealing material is wound around the object with the projections and the recesses being about to be fitted to each other.

Figure 15A:
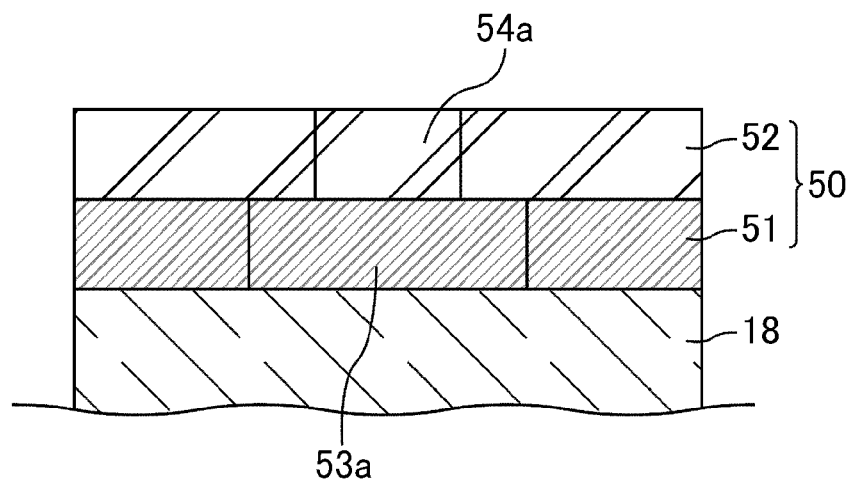
FIG. 15A is a schematic cross-sectional view along the thickness direction of the holding sealing material of the fifth embodiment of the present invention in the state that the holding sealing material is wound around the object with the projections and the recesses fitted to each other.
Figure 15B:
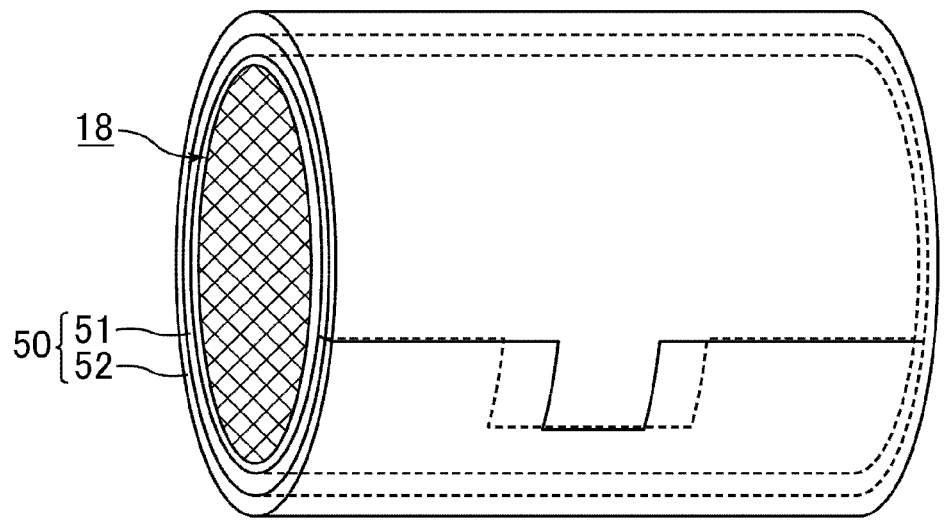
FIG. 15B is a schematic perspective view of the holding sealing material of the fifth embodiment of the present invention in the state that the holding sealing material is wound around the object with the projections and the recesses fitted to each other.

FIG. 15A is a schematic cross-sectional view of the holding sealing material of the fifth embodiment of the present invention along the thickness direction in the state that the holding sealing material is wound around the object with the projections and the recesses fitted to each other, and FIG. 15B is a schematic perspective view of the holding sealing material of the fifth embodiment of the present invention in the state that the holding sealing material is wound around the object with the projections and the recesses fitted to each other.

In the holding sealing material 50 illustrated in FIG. 13, a projection 54a of a mat 52, which is a longest mat, has a smaller area than a projection 53a of a mat 51, which is a shortest mat. Specifically, regarding to the projections 53a and 54a, the lengths L51 and L52 are the same, and the width W52 is narrower than the width W51. Thus, the area of the projection 54a is smaller than the area of the projection 53a.

The recesses 53b and 54b do not have the same shape and each have a different shape because the recesses 53b and 54b are designed to be fitted to the projections 53a and 54a, respectively. Specifically, regarding to the recesses 53b and 54b, the longitudinal lengths L53 and L54 are the same, and the width W54 is narrower than the width W53.

The area of the projection 54a of the mat 52 may be appropriately determined, as long as it is smaller than the area of the projection 53a of the mat 51. For example, the area of the projection 54a is preferably from about 30% to about 95%, and is more preferably from about 40% to about 90% of the area of the projection 53a. In this case, the holding sealing material 50 tends to be successfully wound around the object in a manner described below.

An effective way to wind the holding sealing material 50 having the above structure around the object is to bring the side with the projections 53a and 54a into contact with the object and then fit the recesses 53b and 54b to the projections 53a and 54a, respectively.

The following will describe how the recesses are fitted to the projections in the case of winding the holding sealing material around the object by such a method, with reference to FIGS. 14 and 15.

As illustrated in FIG. 14A, the side with the projection 53a of the mat 51 and the projection 54a of the mat 52 is brought into contact with the object 18 in such a manner that the mat 51, which is the shortest mat, is contacted with the object 18. Then, the recesses 53b and 54b are simultaneously fitted to the projections 53a and 54a, respectively, along the direction of the arrow A.

Here, since side portions 56 on both sides of the recess 54b of the mat 52 have a larger area than side portions 55 on both sides of the recess 53b of the mat 51, the side portions 56 on both sides of the recess 54b more strongly press the side portions 55 on both sides of the recess 53b against the object 18, compared to the case that the projection 54a has the same area as the projection 53a. Accordingly, the recess 53b is surely pressed and fitted to the projection 53a even if the recesses 53b and 54b are slightly dislocated.

Since the width W53 of the recess 53b is wider than the width W54 of the recess 54b, the recess 53b tends to easily pass through the projection 54a without overlapping on the projection 54a, and then be easily pressed to the projection 53a to be fitted to the projection 53a. In particular, it becomes easier to prevent the corners on both sides of the recess 53b (indicated by broken lines B in FIG. 14A from overlapping on the projection 54a.

As described above, since the area of the projection 54a is smaller than the area of the projection 53a, it is easier to prevent overlap between the mats and to successfully fit the projection and the recess of each mat, as illustrated in FIGS. 15A and 15B.

The mats 51 and 52 may be separately wound around the object 18 one by one. However, in order to improve the working efficiency, two or more mats are simultaneously wound around the object 18.

In addition to the above example illustrated in FIGS. 15A and 15B, a holding sealing material including three or more mats each having a projection whose area sequentially decreases from the shortest mat to the longest mat is also one example of the embodiment in which the projection of the longest mat has a smaller area than the projection of the shortest mat. Another example thereof is a holding sealing material in which the length of the projection projecting in the longitudinal direction of the longest mat is shorter than the length of the projection projecting in the longitudinal direction of the shortest mat, and in which the width of the projection of the longest mat is narrower than the width of the projection of the shortest mat. Still another example thereof is a holding sealing material in which the projection of the longest mat and the projection of the shortest mat are located such that one side of each projection projecting in the longitudinal direction of the mats overlies that of the other projection in the state that the holding sealing material is wound around the object, and in which the width of the projection of the longest mat is narrower than the width of the projection of the shortest mat. In addition, the longest mat and shortest mat each may have a plurality of projections.

These structures enable the recesses to be successfully fitted to the projections even if the mats are slightly dislocated in the width direction due to deformation of a mat or the like when the mats are wound together around the object. In addition, these structures enable the recess of a mat closer to the object to be successfully fitted to the corresponding projection even if the above-mentioned mat, which is located inward of other mat(s), is difficult to see. Consequently, it becomes easier to prevent overlap between the mats.

The holding sealing material of the fifth embodiment of the present invention can also exhibit the above-mentioned effects (1) to (7) described in the first embodiment of the present invention.

Sixth Embodiment

The following will discuss a sixth embodiment which is one embodiment of the holding sealing material of the present invention, with reference to the figures. Here, components having the same features as those of the first embodiment of the present invention are indicated by the same reference signs and the description thereof is omitted.

Figure 16A:
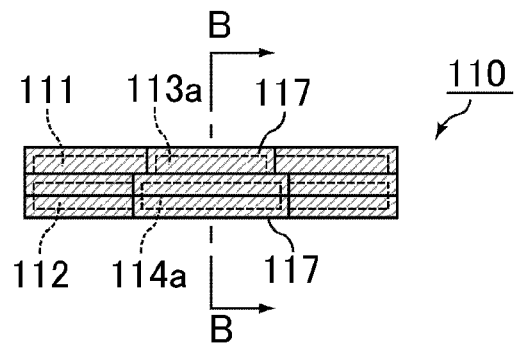
FIG. 16A is a front view of a holding sealing material of a sixth embodiment of the present invention.
Figure 16B:
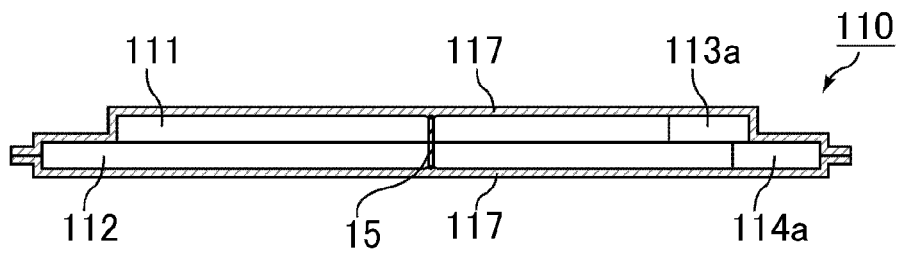
FIG. 16B is a B-B line cross-sectional view of the holding sealing material illustrated in FIG. 16A along the longitudinal direction.

FIG. 16A is a front view of a holding sealing material of the sixth embodiment of the present invention, and FIG. 16B is a B-B line cross-sectional view of the holding sealing material illustrated in FIG. 16A along the longitudinal direction.

As illustrated in FIGS. 16A and 16B, the holding sealing material 110 has a similar structure to the holding sealing material of the first embodiment of the present invention, and specifically has a structure in which a mat 111 having a projection 113a is combined with a mat 112 having a projection 114a at a fixed part 15. The combined mats 111 and 112 are entirely covered with a flammable film 117. This flammable film 117 is an air-impermeable and sack-shaped film, and encloses the mats 111 and 112.

The mats 111 and 112 according to the present embodiment are needle mats including inorganic fibers, like those of the above embodiments, but the shape thereof is maintained by the flammable film 117, not by a binder.

Such mats can be prepared, for example, by forcibly discharging air in the film 117 with a vacuum pump or the like disposed at an open end of the film 117, before sealing the film 117 containing the mats 111 and 112 therein, and then sealing the film 117 containing the mats 111 and 112 therein under reduced pressure. The film 117 can be sealed, for example, by thermally fusing the periphery of the film 117.

Here, a fused portion of the film along the projections, the recesses and the like is preferably cut to a certain size so as not to prevent fitting between the projections and the recesses.

Here, it becomes easier to compress the mats 111 and 112 to a desired thickness by adjusting the level of pressure reduction.

The holding sealing material 110 enclosed in the film 117 as described above is wound around, for example, an exhaust gas treating body and then disposed between the exhaust gas treating body and a casing. Since the holding sealing material 110 is compressed as described above, it can be easily disposed in the casing. The film disposed in the casing is partially opened or thermally decomposed in use such that the compressed mats recover their thickness. As a result, the holding sealing material 110 is held without space between the exhaust gas treating body and the casing.

Examples of the air-impermeable flammable film used in the present embodiment include plastic films. Examples of the plastic films include films made of nylon, polyethylene, polyethylene terephthalate, or the like.

In order to easily wind the holding sealing material around the object and to provide ability to maintain the shape of the mats, the thickness of the flammable film is preferably from about 20 μm to about 200 μm. If the flammable film has a thickness of not less than about 20 μm, the film is never too thin and is likely to be more resistant to tearing when the holding sealing material is wound around the object. If the flammable film has a thickness of not more than about 200 μm, the film is never too thick and is less likely to have reduced flexibility. In this case, the working efficiency of the process of winding the holding sealing material around the object is less likely to be reduced.

In the example illustrated in FIGS. 16A and 16B, the flammable film is an air-impermeable film, and the mats 111 and 112 are enclosed together. However, the present embodiment is not limited to this example. For example, the flammable film may be an air-permeable film. In this case, the air-permeable film may be formed into a sack form as described above and may hold the mats 111 and 112 in ambient atmosphere at normal pressure.

As the air-permeable film, paper or a plastic film is preferable, and a plastic film is more preferable because of its adhesive property. Examples of such paper include thin paper and craft paper. Examples of the plastic film include films made of nylon, polyethylene, polyethylene terephthalate, or the like.

In these cases, the film has tenability (flexibility) because it is not exposed to reduce pressure. Therefore, the holding sealing material is excellent in flexibility and therefore is easily wound around the object with high working efficiency.

In the case that an air-permeable film is used, the fixed part 15 may be formed before the mats 111 and 112 are covered with the film, or alternatively may be formed after the laminated mats 111 and 112 are covered with the film.

As a method for forming the fixed part 15 after covering the laminated mats 111 and 112 with the film, for example, a method for fusing the film by applying pressure to a part to be the fixed part 15 may be used instead of the machine-sawing method described in the first embodiment.

The holding sealing material of the sixth embodiment of the present invention can also exhibit the following effects in addition to the above-mentioned effects (1) to (7) of the first embodiment of the present invention.

(8) Since the mats are entirely covered with and sealed up in the flammable film, the mats tend to maintain their shape without binders or the like, and the working efficiency of pre-processes before winding the holding sealing material around the object is likely to be enhanced. Moreover, it is easier to keep the mats compressed because they are sealed up in the film under reduced pressure. Therefore, for example, in the case that the holding sealing material is used for an exhaust gas treating body, the holding sealing material tends to be more easily inserted into a casing, and thereby further to enhance the working efficiency. In addition, the holding sealing material tends to firmly hold the object when the mats are expanded by decomposition of the film by heat of exhaust gas or the like after the holding sealing material is wound around the object.

(9) Since the fitting portions of the projection of each mat are covered with the flammable film, the projections and the recesses tend to be more smoothly fitted to each other because the projections are more likely to smoothly slide, compared to those with a surface on which fibers are exposed. Here, the term "fitting portions of the projection" herein means portions of the projection to be contacted with the recess, that is, faces of the projection along the thickness direction.

Seventh Embodiment

The following will discuss a seventh embodiment which is one embodiment of the holding sealing material of the present invention, with reference to the figures. Here, components having the same features as those of the first embodiment of the present invention are indicated by the same reference signs and the description thereof is omitted.

Figure 17A:
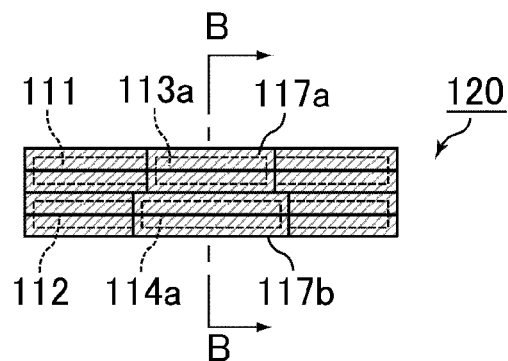
FIG. 17A is a front view of a holding sealing material of a seventh embodiment of the present invention.
Figure 17B:
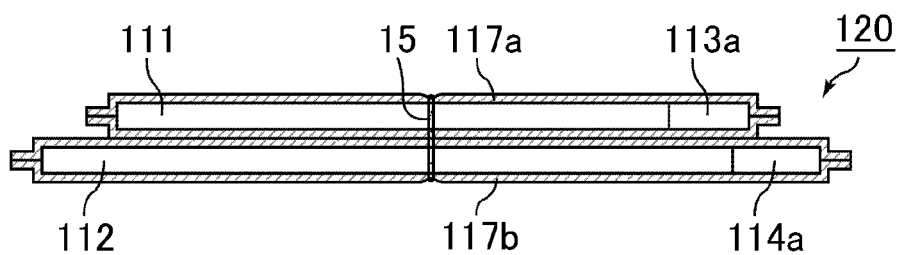
FIG. 17B is a B-B line cross-sectional view of the holding sealing material illustrated in FIG. 17A along the longitudinal direction.

FIG. 17A is a front view of a holding sealing material of the seventh embodiment of the present invention, and FIG. 17B is a B-B line cross-sectional view of the holding sealing material illustrated in FIG. 17A along the longitudinal direction.

As illustrated in FIGS. 17A and 17B, the holding sealing material 120 has a similar structure to the holding sealing material of the first embodiment of the present invention, and specifically has laminated mats 111 and 112. The mat 111 has a projection 113a, and the mat 112 has a projection 114a.

The mat 111 is entirely covered with a flammable film 117a. Similarly, the mat 112 is also entirely covered with a flammable film 117b.

The mat 111 covered with the flammable film 117a and the mat 112 covered with the flammable film 117b are laminated and combined with each other at a fixed part 15.

As a method for forming the fixed part 15, for example, a method for fusing the films by applying pressure on a part to be the fixed part 15, or the like may be used instead of the machine-sawing method described in the first embodiment.

The flammable films 117a and 117b are the same as the flammable film 117 used in the sixth embodiment, and may be air permeable or air impermeable.

The mat 111 covered with the flammable film 117a and the mat 112 covered with the flammable film 117b may be compressed or may be held in an atmosphere at normal pressure. If the mats 111 and 112 are compressed, the holding sealing material 120 is likely to be easily disposed in the casing as described in the sixth embodiment. If the mats 111 and 112 are held in an atmosphere at normal pressure, the holding sealing material is likely to be excellent in flexibility and therefore tends to be easily wound around the object with high working efficiency.

The holding sealing material of the seventh embodiment of the present invention can also exhibit the above-mentioned effects (1) to (9) of the sixth embodiment of the present invention.

Eighth Embodiment

The following will discuss an eighth embodiment which is one embodiment of the holding sealing material of the present invention, with reference to the figures. Here, components having the same features as those of the first embodiment of the present invention are indicated by the same reference signs and the description thereof is omitted.

FIG. 18A is a front view of a holding sealing material of the eighth embodiment of the present invention, and FIG. 18B is a B-B line cross-sectional view of the holding sealing material illustrated in FIG. 18A along the longitudinal direction.

As illustrated in FIGS. 18A and 18B, the holding sealing material 130 has a similar structure to the holding sealing material of the first embodiment of the present invention, and specifically has laminated mats 111 and 112. The mat 111 has a projection 113a, and the mat 112 has a projection 114a.

The projection 113a of the mat 111 is covered with an flammable film 117c. The projection 114a of the mat 112 is covered with a flammable film 117d.

Since, in this structure, the fitting portions (the faces along the longitudinal direction) of the projection of each mat are covered with the flammable film, the projections and the recesses tend to be more smoothly fitted to each other in the state that the holding sealing material is wound around the object because the projections are more likely to smoothly slide, compared to those with a surface on which fibers are exposed.

Although the flammable films 117c and 117d are provided only on the faces along the longitudinal direction among the fitting portions of the projections fitted into the recesses in FIGS. 18A and 18B, the faces along the width direction may also covered with these flammable films.

The flammable films 117c and 117d are the same as the flammable film 117 used in the sixth embodiment, and may be air permeable or air impermeable.

The holding sealing material of the eighth embodiment of the present invention can also exhibit the above-mentioned effects (1) to (7) and (9) of the sixth embodiment of the present invention.

Ninth Embodiment

Figure 19:
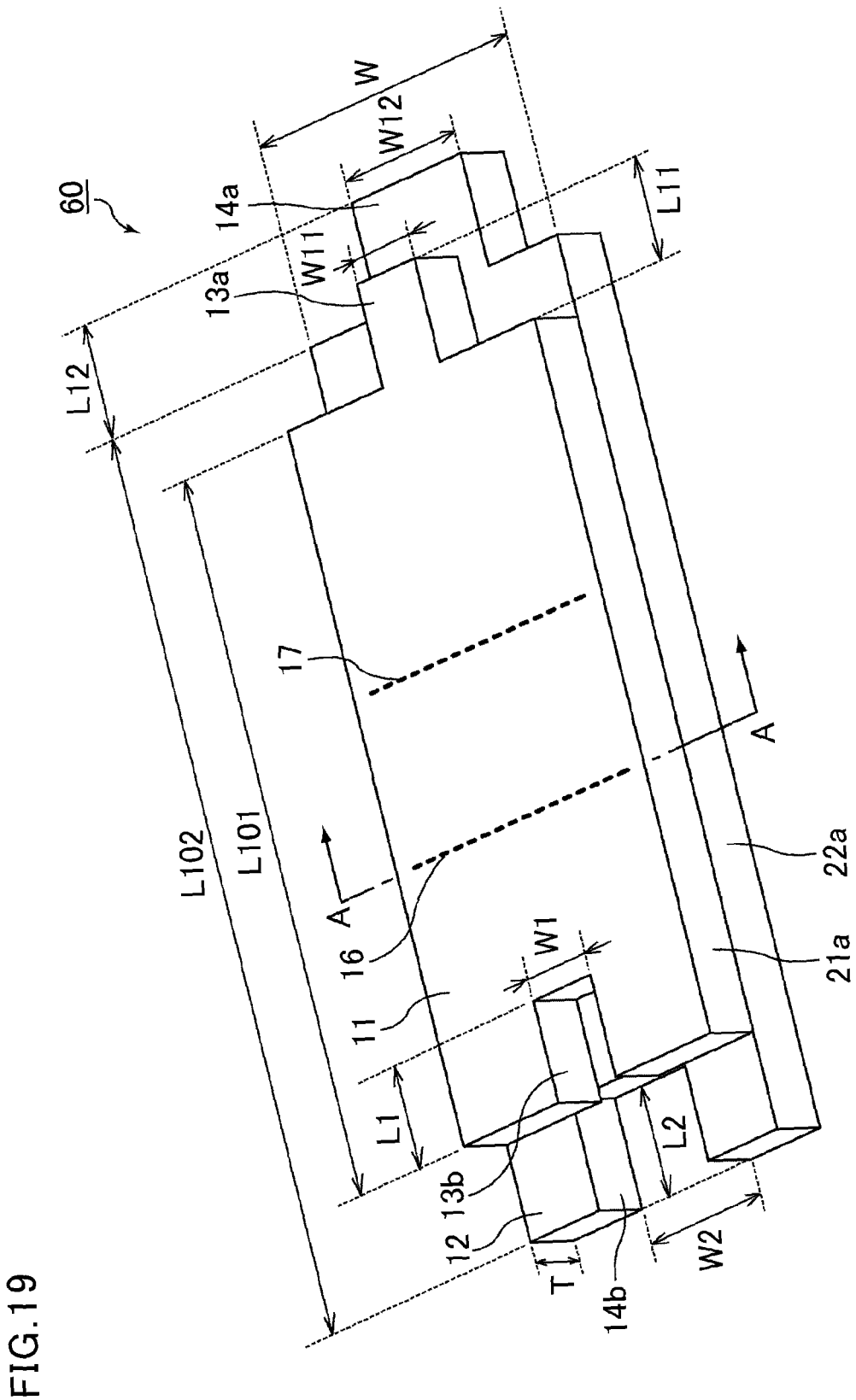
FIG. 19 is a perspective view illustrating the structure of a holding sealing material of a ninth embodiment of the present invention.

The following will discuss a ninth embodiment which is one embodiment of the holding sealing material of the present invention, with reference to FIGS. 19 and 20. Here, components having the same features as those of the first embodiment of the present invention are indicated by the same reference signs and the description thereof is omitted.

In the holding sealing material according to the embodiment of the present invention, the number of fixed parts is not limited to one and may be two or more. FIG. 19 is a perspective view illustrating the structure of a holding sealing material of the ninth embodiment of the present invention. Since the holding sealing material 60 illustrated in FIG. 19 has the same structure as the holding sealing material 10 of the first embodiment of the present invention, except that it has two fixed parts, only fixed parts 16 and 17 will be described below.

As illustrated in FIG. 19, the laminated mats 11 and 12 are combined with each other at these two fixed parts 16 and 17.

Figure 20A:
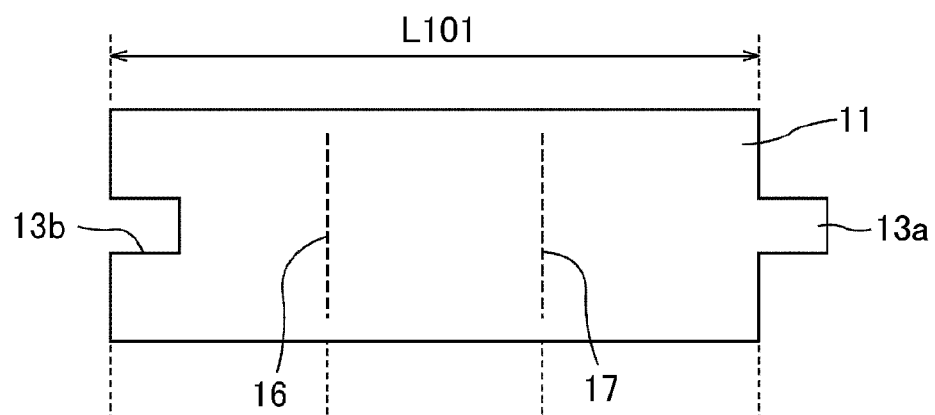
FIG. 20A is a plan view schematically illustrating a shortest mat of the holding sealing material of the ninth embodiment of the present invention.

The fixed parts 16 and 17 are located at different positions in a projection view of the fixed parts to the side face along the longitudinal direction of the mats. The positional relationship of these fixed parts is described with reference to FIGS. 20A and 20B. FIG. 20A is a plan view schematically illustrating a shortest mat (mat 11) of the holding sealing material of the ninth embodiment of the present invention, and FIG. 20B is an axial projection view schematically illustrating the positional relationship of the fixed parts projected on a longitudinal axis in a side view of the shortest mat illustrated in FIG. 20A.

Figure 20B:
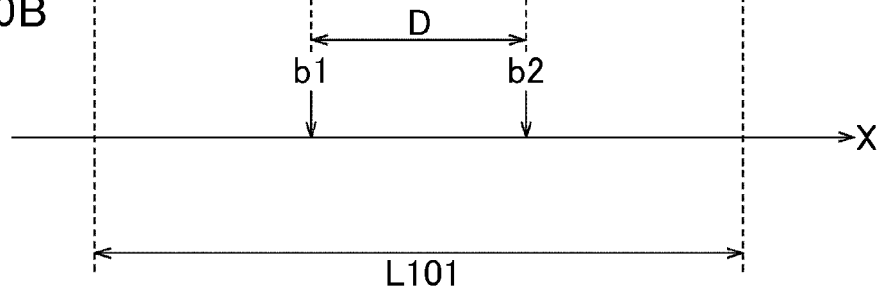
FIG. 20B is an axial projection view schematically illustrating the positional relationship of the fixed parts projected on a longitudinal axis in a side view of the shortest mat illustrated in FIG. 20A.

If the fixed part 16 that is closer to a recess 13b and the fixed part 17 that is closer to a projection 13a in FIG. 20A are projected on a longitudinal axis X in a side view, the fixed parts 16 and 17 are, as illustrated in FIG. 20B, located at the positions on the longitudinal axis X indicated by the arrows $b_1$ and $b_2$, respectively. Thus, the fixed parts 16 and 17 do not coincide with each other and are located at different positions in the longitudinal direction when projected on the longitudinal axis X. A maximum projection distance of the fixed parts 16 and 17 is indicated by the arrow D. The term "maximum projection distance" used herein refers to the greatest projection distance among the projection distances between the fixed parts projected on the longitudinal axis in a side view, not to the greatest linear distance among the linear distances between the fixed parts.

The maximum projection distance D is not particularly limited and is preferably from about 1/20 to about 3/4 of the longitudinal length of the shortest mat that has the shortest longitudinal length among the mats. In this case, it becomes easier to reduce tensile stress generated on the outer surface and wrinkles on the inner surface of the holding sealing material which are generated when the holding sealing material is wound around the object, to levels that will not cause any problems during the winging operation or in use.

The fixed parts 16 and 17 are spaced apart from the longer sides 21a and 22a of the mats 11 and 12 by predetermined distances, and continuously extend to cover from about 50% to about 99.5% of the length of the mat 11 in the width direction.

Although the ends of the fixed parts 16 and 17 are preferably spaced apart from the longer sides of the mats 11 and 12, the ends of the fixed parts 16 and 17 may extend to the longer sides of the mats 11 and 12, as long as they do not cause any problems in use of the product.

The holding sealing material of the present embodiment can also exhibit the following effect in addition to the above-mentioned effects (1) to (7) of the first embodiment of the present invention.

(10) Compared with the case where the number of fixed parts is one, dislocation between the mats can be more effectively prevented. Since the mats are combined with one another at two or more fixed parts and at least two fixed parts among the fixed parts are located at different positions on the longitudinal axis in a side view, the fixed parts tend to contribute to more positively prevent dislocation between the mats in the width direction. Owing to the tendency to prevent dislocation between the mats, the mats are easier to handle when the mats are wound around the object. Therefore, the working efficiency is likely to be improved. Here, the phrase "in a projection view" used herein means that the fixed parts are projected onto the longitudinal axis in the side view.

Other Embodiments

The method for fixing the mats of the holding sealing material according to the embodiment of the present invention is not limited to machine-sewing, and any fixing method can be employed as long as the mats can be fixed to one another. Examples of such methods include needle-punching and fixing methods using an adhesive, a staple, a pin, a tape or the like. Machine-sewing is desirable among these fixing methods because this method makes it easier to firmly fix the mats to one another and can easily change the fixing manner if requirements of fixing are changed.

The shapes of the recesses and the projections formed on the shorter sides of the holding sealing material according to the embodiment of the present invention are not particularly limited, provided that the shapes enable the recesses and the projections to be fitted to each other, and that the projection of the shortest mat has a smaller area than the projection of the longest mat or the projection of the longest mat has a smaller area than the projection of the shortest mat. As a pair of a recess and a projection, preferably, a projection that projects over a size from about 10 mm in width×about 10 mm in length to about 300 mm in width×about 100 mm in length is formed on a part of one shorter side, and a recess to be fitted to the projection is formed on a part of the other shorter side. In the case where an exhaust gas purifying apparatus is manufactured using a holding sealing material having such shapes of recesses and projections, an exhaust gas treating body is likely to be surely held by the holding sealing material, possibly leading to excellent handleability of the holding sealing material.

In the holding sealing material according to the embodiment of the present invention, the average fiber length of the inorganic fibers is desirably from about 30 µm to about 120 mm, and more desirably from about 50 µm to about 100 mm. If the average fiber length of the inorganic fibers is not less than about 30 µm, the fibers are likely to be sufficiently entangled with one another, for example, by the needle punching treatment. As a result, problems such as drop of a portion of the fibers are likely to be avoided. If the average fiber length of the inorganic fibers does not exceed about 100 mm, the resulting mats may be excellent in flexibility and therefore are less likely to exhibit reduced winding ability when the mats are wound around the object.

In the holding sealing material according to the embodiment of the present invention, the inorganic fibers preferably have an average fiber diameter of from about 2 µm to about 12 µm, and more preferably from about 3 µm to about 10 µm. If the average fiber diameter of the inorganic fibers is not less than about 2 µm, the fiber diameter is never too small and the fibers are less likely to be entangled with one another too tightly. Therefore, the resulting mats may be excellent in flexibility and tend to exhibit high winding ability when the mats are wound around the object. If the average fiber diameter of the inorganic fibers is not more than about 12 µm, the fibers may be never too thick and are likely to be sufficiently entangled with one another, for example, by the needle punching treatment. As a result, problems such as drop of a portion of the fibers are likely to be avoided.

The amount of binder contained in the holding sealing material according to the embodiment of the present invention is desirably from about 0.2% to about 20% by weight, more desirably from about 0.5% to about 15% by weight, and further more desirably from about 1% to about 12% by weight. If the amount of the organic binder is not less than about 0.2% by weight, the bulk density of the holding sealing material is less likely to be low. In this case, the stuffing property of the holding sealing material into a casing is less likely to be lowered. Moreover, since the inorganic fibers that form the holding sealing material tend to be sufficiently bonded to one another, the inorganic fibers are less likely to be scattered. In the case that the holding sealing material is used for an exhaust gas purifying apparatus, if the amount of the binder is not more than about 20.0% by weight, exhaust gas to be discharged tends to contains less organic components, possibly resulting in a lower load on the environment.

Although not particularly limited, the weight per unit area of the holding sealing according to the embodiment of the present invention is desirably from about 200 g/m to about 2000 g/m$^2$, and more desirably from about 300 g/m$^2$ to about 1900 g/m$^2$. If the weight per unit area of the holding sealing material is not less than about 200 g/m$^2$, the holding sealing material tends to provide sufficient effect of preventing gas leak when wound around an exhaust gas treating body, which is an object to be wound. If the weight per unit area of the holding sealing material is not more than about 2000 g/m$^2$, the holding sealing material is less likely to be poor in flexibility and to exhibit reduced winding ability when wound around the object.

The organic binder used for production of the holding sealing material according to the embodiment of the present invention is not limited to the above-mentioned acrylic latex or rubber latex, and examples thereof include water-soluble organic polymers such as carboxymethyl cellulose and polyvinyl alcohol; thermoplastic resin such as styrene resin; thermosetting resins such as epoxy resin; and the like. In the embodiment of the present invention, acrylic rubber, acrylonitrile-butadiene rubber or styrene-butadiene rubber can be suitably used.

The emulsion may include two or more kinds of the above-mentioned organic binders.

In addition, examples of the emulsion include a latex prepared by dispersing the above-mentioned organic binder in water; a solution prepared by dissolving the above-mentioned organic binder in water or an organic solvent; and the like.

The thickness of each of the mats of the holding sealing material according to the embodiment of the present invention may be substantially the same as or different from each other. The thickness can be changed in consideration of properties required for the holding sealing material such as flexibility and holding force.

The inorganic binder used for manufacturing the holding sealing material according to the embodiment of the present invention is not limited to the above-mentioned alumina sol, and may be silica sol or the like.

The material for the casing as one component of the exhaust gas purifying apparatus according to the embodiment of the present invention is not particularly limited as long as it is a heat-resistant metal. Specific examples thereof include metals such as stainless steel and iron.

In a case where an exhaust gas purifying apparatus is manufactured by using a cylindrical casing, what is called a sizing system may be used to manufacture the exhaust gas purifying apparatus. Specifically, an exhaust gas treating body covered with the holding sealing material is inserted into a casing whose inner diameter is larger than the total length of the total combined length of the diameter of the end face of the exhaust gas treating body and the thickness of the holding sealing material in the state of being wound around the exhaust gas treating body, and then the casing is compressed from the outside by a pressing machine or the like.

The exhaust gas treating body as one component of the exhaust gas purifying apparatus according to the embodiment of the present invention may be prepared as an integral exhaust gas treating body configured by one sintered body as a whole, as illustrated in FIG. 6A, or may be prepared as an aggregated exhaust gas treating body obtained by using adhesive layers and combining a plurality of honeycomb fired bodies, each having a structure in which a large number of cells are longitudinally disposed in parallel with one another, with a cell wall being interposed therebetween.

A catalyst may be supported on the exhaust gas treating body that is one component of the exhaust gas purifying apparatus according to the embodiment of the present invention. Examples of the catalyst include: noble metals such as platinum, palladium, and rhodium; alkali metals such as potassium and sodium; alkali earth metals such as barium; metal oxides; and the like. Any of these catalysts can be used alone, or two or more of these may be used in combination.

The above-mentioned oxide catalysts are not particularly limited as long as they can lower the burning temperature of PM, and examples thereof include $CeO_2$, $ZrO_2$, $FeO_2$, $Fe_2O_3$, $CuO$, $CuO_2$, $Mn_2O_3$, $MnO$, complex oxides indicated by the composition formula $A_nB_{1-n}CO_3$ (in the formula, A is La, Nd, Sm, Eu, Gd or Y; B is an alkali metal or alkali-earth metal; C is Mn, Co, Fe or Ni; and $0 \le n \le n1$), and the like. Any of these catalysts may be used alone, or two or more kinds of these may be used in combination; however, the catalyst desirably contains at least $CeO_2$. By supporting a metal oxide of this kind, the burning temperature of PM is likely to be lowered.

Examples of the method for applying the catalyst to the exhaust gas treating body include: a method in which the exhaust gas treating body is impregnated with a solution containing the catalyst and then heated; a method for forming a catalyst supporting layer including an alumina film on the surface of the exhaust gas treating body and applying the catalyst to the alumina film; and the like.

Examples of the method for forming the alumina film include: a method in which the exhaust gas treating body is impregnated with a solution of a metal compound containing aluminum in a form of $Al(NO_3)_3$ or the like and then heated; a method in which the gas treating body is impregnated with a solution containing alumina powder and then heated; and the like.

Examples of the method for applying catalyst to the alumina film include: a method in which the exhaust gas treating body is impregnated with a solution containing a noble metal, an alkaline metal, an alkaline earth metal, a metal oxide, or the like, and then heated; and the like.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A holding sealing material comprising:
   a plurality of laminated mats each including inorganic fibers; and
   one or more fixed parts partially combining said mats, wherein
   each of said mats has a basic rectangular shape that has longer sides along a longitudinal direction of said mats and shorter sides substantially perpendicular to the longer sides in a plan view,
   each of said mats has a recess on one of the shorter sides of said rectangular shape, and a projection on another shorter side,
   each of said mats is designed to be wound around an object to be wound so that the projection and the recess are fitted to each other,
   said mats have respective longitudinal lengths that increase as a distance from said object to each of said mats increases, a mat that is placed at a closest position to said object having a shortest longitudinal length, and
   an area of the projection of the mat that is placed at the closest position to said object is smaller than an area of the projection of a mat that is placed at a farthest position from said object.

2. The holding sealing material according to claim 1, wherein
   projections of said mats have respective areas that decrease in an order from the mat that is placed at the farthest position from said object to the mat that is placed at the closest position to said object.

3. The holding sealing material according to claim 1, wherein
   the projection of the mat that is placed at the closest position to said object and the projection of the mat that is placed at the farthest position from said object have a same projecting length in the longitudinal direction of said mats, and
   the projection of the mat that is placed at the closest position to said object has a width narrower than a width of the projection of the mat that is placed at the farthest position from said object.

4. The holding sealing material according to claim 1, wherein
   the projection of the mat that is placed at the closest position to said object has a projecting length in the longitudinal direction of said mats shorter than a projecting length of the projection of the mat that is placed at the farthest position from said object, and
   the projection of the mat that is placed at the closest position to said object has a width narrower than a width of the projection of the mat that is placed at the farthest position from said object.

5. The holding sealing material according to claim 1, wherein
   in a state that said holding sealing material is wound around said object, one of sides of the projection projecting along the longitudinal direction of the mat that is placed at the farthest position from said object overlies one of sides of the projection projecting along the longitudinal direction of the mat that is placed at the closest position to said object, and
   the projection of the mat that is placed at the closest position to said object has a width narrower than a width of the projection of the mat that is placed at the farthest position from said object.

6. The holding sealing material according to claim 1, wherein
   at least one of said mats has one or more additional projections.

7. The holding sealing material according to claim 1, wherein
   a number of the fixed parts is at least two, and
   in a projection view of the fixed parts to a side face along the longitudinal direction of the mats, at least two fixed parts out of said fixed parts are disposed at different positions in the longitudinal direction.

8. The holding sealing material according to claim 1, wherein
   said fixed parts are spaced apart from at least one of the longer sides of each of said mats.

9. The holding sealing material according to claim 1, further comprising:
   a flammable film covering a fitting portion in projections of said mats.

10. The holding sealing material according to claim 9, wherein
    said flammable film entirely covers said laminated mats.

11. The holding sealing material according to claim 9, wherein
    said flammable film covers each of said laminated mats.

12. The holding sealing material according to claim 9, wherein
    said flammable film comprises nylon, polyethylene, or polyethylene terephthalate.

13. The holding sealing material according to claim 9, wherein
    said flammable film has a thickness of from about 20 μm to about 200 μm.

14. The holding sealing material according to claim 1, wherein
    said mats include a binder.

15. The holding sealing material according to claim 1, wherein
    said mats are needle-punched.

16. The holding sealing material according to claim 1, wherein
    said inorganic fibers comprise a complex of alumina and silica.

17. A method for winding a holding sealing material around an object to be wound, comprising:

winding the holding sealing material according to claim 1 around said object, said winding comprising:
bringing a side with recesses of said holding sealing material into contact with the object; and
fitting projections of said holding sealing material into the recesses.

18. The holding sealing material according to claim 1, wherein
said object comprises a catalyst carrier or an exhaust gas filter.

19. An exhaust gas purifying apparatus comprising:
a pillar-shaped exhaust gas treating body having a cell wall extending along a longitudinal direction of said exhaust gas treating body to define a plurality of cells;
a casing accommodating said exhaust gas treating body; and
a holding sealing material disposed between said exhaust gas treating body and said casing to hold said exhaust gas treating body,
wherein
said holding sealing material comprises the holding sealing material according to claim 1.

20. The exhaust gas purifying apparatus according to claim 19, wherein
said exhaust gas treating body comprises a catalyst carrier or an exhaust gas filter.

21. The holding sealing material according to claim 1, wherein
the area of the projection of the mat that is placed at the closest position to said object is from about 30% to about 95% of the area of the projection of the mat that is placed at the farthest position from said object.

22. The holding sealing material according to claim 1, wherein
the plurality of laminated mats include a first mat and a second mat which contact each other, the first mat being closest to said object and the second mat being farthest to said object,
the first mat has a plurality of first projections and the second mat has a plurality of second projections, each of the plurality of first projections overlapping one of the plurality of second projections, and
each of a part of the plurality of first projections has a smaller area than one of the plurality of second projections which overlaps the each of the part of the plurality of first projections.

23. A holding sealing material comprising:
a plurality of laminated mats each including inorganic fibers; and
one or more fixed parts partially combining said mats,
wherein
each of said mats has a basic rectangular shape that has longer sides along a longitudinal direction of said mats and shorter sides substantially perpendicular to the longer sides in a plan view,
each of said mats has a recess on one of the shorter sides of said rectangular shape, and a projection on another shorter side,
each of said mats is designed to be wound around an object to be wound so that the projection and the recess are fitted to each other,
said mats have respective longitudinal lengths that increase as a distance from said object to each of said mats increases, a mat that is placed at a closest position to said object having a shortest longitudinal length, and
an area of the projection of a mat that is placed at a farthest position from said object is smaller than an area of the projection of the mat that is placed at the closest position to said object.

24. The holding sealing material according to claim 23, wherein
projections of said mats have respective areas that decrease in an order from the mat that is placed at the closest position to said object to the mat that is placed at the farthest position from said object.

25. A method for winding a holding sealing material around an object to be wound, comprising:
winding the holding sealing material according to claim 23 around said object, said winding comprising:
bringing a side with projections of said holding sealing material in contact with the object; and
fitting recesses of said holding sealing material to the projections.

26. The holding sealing material according to claim 23, wherein
said object comprises a catalyst carrier or an exhaust gas filter.

27. An exhaust gas purifying apparatus comprising:
a pillar-shaped exhaust gas treating body having a cell wall extending along a longitudinal direction of said exhaust gas treating body to define a plurality of cells;
a casing accommodating said exhaust gas treating body; and
a holding sealing material disposed between said exhaust gas treating body and said casing to hold said exhaust gas treating body,
wherein
said holding sealing material comprises the holding sealing material according to claim 23.

28. The holding sealing material according to claim 23, wherein
the area of the projection of the mat that is placed at the farthest position from said object is from about 30% to about 95% of the area of the projection of the mat that is placed at the closest position to said object.

* * * * *